(12) United States Patent
Hyun et al.

(10) Patent No.: US 9,916,237 B2
(45) Date of Patent: Mar. 13, 2018

(54) MODEL BASED CONFIGURATION PARAMETER MANAGEMENT

(71) Applicant: SanDisk Technologies, Inc., Plano, TX (US)

(72) Inventors: Jea Woong Hyun, Los Altos, CA (US);
Joshua Perschon, Sandy, UT (US);
Rick Lucky, Louisville, CO (US);
Hairong Sun, Superior, CO (US);
James Peterson, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 188 days.

(21) Appl. No.: 14/612,282

(22) Filed: Feb. 2, 2015

(65) Prior Publication Data
US 2016/0170871 A1    Jun. 16, 2016

Related U.S. Application Data

(60) Provisional application No. 62/091,396, filed on Dec. 12, 2014.

(51) Int. Cl.
G06F 12/02    (2006.01)
G06F 12/06    (2006.01)
G06F 3/06     (2006.01)

(52) U.S. Cl.
CPC .......... G06F 12/0246 (2013.01); G06F 3/06 (2013.01); G06F 2212/7201 (2013.01); G06F 2212/7202 (2013.01); G06F 2212/7206 (2013.01)

(58) Field of Classification Search
None
See application file for complete search history.

(56) References Cited

U.S. PATENT DOCUMENTS

| | | | |
|---|---|---|---|
| 6,284,602 B1 | 9/2001 | He et al. | |
| 7,079,419 B2 | 7/2006 | Roohparvar | |
| 7,274,600 B2 | 9/2007 | Roohparvar | |
| 7,782,674 B2 | 8/2010 | Roohparvar et al. | |
| 8,422,296 B2 | 4/2013 | Franca-Neto et al. | |
| 8,542,539 B2 | 9/2013 | Ghodsi et al. | |
| 8,755,227 B2 | 6/2014 | Lin et al. | |
| 2005/0105333 A1 | 5/2005 | Park et al. | |
| 2010/0091535 A1* | 4/2010 | Sommer | G11C 8/20 365/45 |

(Continued)

FOREIGN PATENT DOCUMENTS

EP    2597648    5/2013

*Primary Examiner* — Yaima Rigol
(74) *Attorney, Agent, or Firm* — Kunzler, PC

(57) ABSTRACT

Apparatuses, systems, methods, and computer program products are disclosed for model based configuration parameter management. An association module is configured to group a plurality of erase blocks of a non-volatile memory medium based on an amount of time since data has been written to the plurality of erase blocks. A read module is configured to sample data of at least two word lines from at least one erase block from each of a plurality of groups of erase blocks. A configuration parameter module is configured to determine different read voltage thresholds for different word lines of groups of erase blocks using different read voltage threshold models for different groups based on sampled data.

20 Claims, 12 Drawing Sheets

(56) References Cited

U.S. PATENT DOCUMENTS

| | | | |
|---|---|---|---|
| 2010/0142267 A1* | 6/2010 | Sarin | G11C 11/5642 365/185.2 |
| 2013/0132652 A1* | 5/2013 | Wood | G06F 12/0246 711/103 |
| 2013/0173972 A1 | 7/2013 | Kubo | |
| 2013/0201769 A1* | 8/2013 | Yang | G11C 16/10 365/189.011 |
| 2013/0232289 A1* | 9/2013 | Zhong | G06F 12/0246 711/102 |
| 2014/0036593 A1* | 2/2014 | Kim | G11C 11/5642 365/185.18 |
| 2014/0063975 A1* | 3/2014 | Shen | G11C 11/5642 365/185.24 |
| 2014/0198567 A1* | 7/2014 | Mokhlesi | G11C 11/5642 365/185.03 |
| 2014/0208174 A1 | 7/2014 | Ellis et al. | |
| 2014/0334228 A1* | 11/2014 | Kim | G06F 11/1072 365/185.03 |

\* cited by examiner

800

| Storage Element 0 123a | | |
|---|---|---|
| Group 802 | Slope 804 | Intercept 806 |
| 0 | $a_0$ | $b_0$ |
| 1 | $a_1$ | $b_1$ |
| 2 | $a_2$ | $b_2$ |
| . . . | | |
| N | $a_N$ | $b_N$ |

. . .

| Storage Element N 123n | | |
|---|---|---|
| Group 802 | Slope 804 | Intercept 806 |
| 0 | $a_0$ | $b_0$ |
| 1 | $a_1$ | $b_1$ |
| 2 | $a_2$ | $b_2$ |
| . . . | | |
| N | $a_N$ | $b_N$ |

| Group 802 | Retention Time (hours) 812 | V0 814 |
|---|---|---|
| 0 | 0 | $Y_{0,0} = a_{0,0}*X + b_{0,0}$ |
| 1 | 1 | $Y_{1,0} = a_{1,0}*X + b_{1,0}$ |
| 2 | 2 | $Y_{2,0} = a_{2,0}*X + b_{2,0}$ |
| 3 | 4 | $Y_{3,0} = a_{3,0}*X + b_{3,0}$ |
| 4 | 8 | $Y_{4,0} = a_{4,0}*X + b_{4,0}$ |
| 5 | 16 | $Y_{5,0} = a_{5,0}*X + b_{5,0}$ |
| 6 | 32 | $Y_{6,0} = a_{6,0}*X + b_{6,0}$ |
| 7 | 64 | $Y_{7,0} = a_{7,0}*X + b_{7,0}$ |
| 8 | 128 | $Y_{8,0} = a_{8,0}*X + b_{8,0}$ |
| 9 | 256 | $Y_{9,0} = a_{9,0}*X + b_{9,0}$ |
| 10 | 512 | $Y_{10,0} = a_{10,0}*X + b_{10,0}$ |
| 11 | 1024 | $Y_{11,0} = a_{11,0}*X + b_{11,0}$ |

| VN 816 |
|---|
| $Y_{0,N} = a_{0,N}*X + b_{0,N}$ |
| $Y_{1,N} = a_{1,N}*X + b_{1,N}$ |
| $Y_{2,N} = a_{2,N}*X + b_{2,N}$ |
| $Y_{3,N} = a_{3,N}*X + b_{3,N}$ |
| $Y_{4,N} = a_{4,N}*X + b_{4,N}$ |
| $Y_{5,N} = a_{5,N}*X + b_{5,N}$ |
| $Y_{6,N} = a_{6,N}*X + b_{6,N}$ |
| $Y_{7,N} = a_{7,N}*X + b_{7,N}$ |
| $Y_{8,N} = a_{8,N}*X + b_{8,N}$ |
| $Y_{9,N} = a_{9,N}*X + b_{9,N}$ |
| $Y_{10,N} = a_{10,N}*X + b_{10,N}$ |
| $Y_{11,N} = a_{11,N}*X + b_{11,N}$ |

. . .

| N | $2^{N-1}$ | $Y_{N,0} = a_{N,0}*X + b_{N,0}$ |
|---|---|---|

| $Y_{N,N} = a_{N,N}*X + b_{N,N}$ |
|---|

FIG. 8B

MODEL BASED CONFIGURATION PARAMETER MANAGEMENT

CROSS-REFERENCES TO RELATED APPLICATIONS

This application claims the benefit of U.S. Provisional Patent Application No. 62/091,396 entitled "Model Based Configuration Parameter Management" and filed on Dec. 12, 2014, for Jea Woong Hyun, et al., which is incorporated herein by reference.

TECHNICAL FIELD

The present disclosure, in various embodiments, relates to memory and/or storage devices and more particularly relates to management of configuration parameters for memory and/or storage devices.

BACKGROUND

Many data storage devices, such as flash memory devices, store data in cells of non-volatile media. A physical property of each cell, such as a stored charge, voltage, material phase, electrical resistance, magnetization, or the like, is alterable to encode data. A cell's physical property may be variable across a range, which may be divided into discrete states, so that different states correspond to different data values. Sensing whether the cell's physical property satisfies one or more read thresholds (e.g., voltage thresholds, resistivity thresholds, or the like) within its range determines the cell's state, thus allowing recovery of a stored data value.

The data-encoding physical property of a cell may vary over time due to cell damage, charge leakage, temperature effects, disturbances from nearby cells, or the like. An error may occur if the cell moves from one state into an adjacent state. As storage density increases, feature size shrinks, making the cells more susceptible to such disturbances. Appropriate management of various configuration parameters may reduce error rates by compensating for such disturbances, however determining and storing multiple different configuration parameters can be resource intensive.

SUMMARY

Methods are presented for model based configuration parameter management. In one embodiment, a method includes performing read operations for at least two sets of cells of a storage region of a non-volatile storage device in response to a trigger. A method, in a further embodiment, includes determining values for a configuration parameter for at least two sets of cells based on read operations. In certain embodiments, a method includes determining different values for a configuration parameter for other sets of cells of a storage region based on a behavior model of values for the configuration parameter determined for at least two sets of cells.

Apparatuses are presented for model based configuration parameter management. In one embodiment, an association module is configured to group a plurality of erase blocks of a non-volatile memory medium based on an amount of time since data has been written to the plurality of erase blocks. A read module, in certain embodiments, is configured to sample data of at least two word lines from at least one erase block from each of a plurality of groups of erase blocks. In a further embodiment, a configuration parameter module is configured to determine different read voltage thresholds for different word lines of a plurality of groups of erase blocks using different read voltage threshold models for different groups based on sampled data.

Systems are presented for model based configuration parameter management. A system, in one embodiment, includes a plurality of storage elements each comprising a plurality of storage regions. A system, in a further embodiment, includes a controller for a plurality of storage elements. A controller, in certain embodiments, classifies storage regions by retention time. In one embodiment, a controller determines different read voltage threshold models for different retention time classifications. In a further embodiment, a controller uses a read voltage threshold for a word line based on a read voltage threshold model and a position of the word line within a storage region.

Computer program products comprising a computer readable storage medium are presented. In certain embodiments, a computer readable storage medium stores computer usable program code executable to perform operations for model based configuration parameter management, substantially as described above with regard to one or more of the presented method, apparatus, and system.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIG. 8A is a schematic block diagram illustrating one embodiment of sets of configuration parameter models for erase blocks of non-volatile memory media;

FIG. 8B is a schematic block diagram illustrating a further embodiment of sets of configuration parameter models for erase blocks of non-volatile memory media;

DETAILED DESCRIPTION

Figure 1:
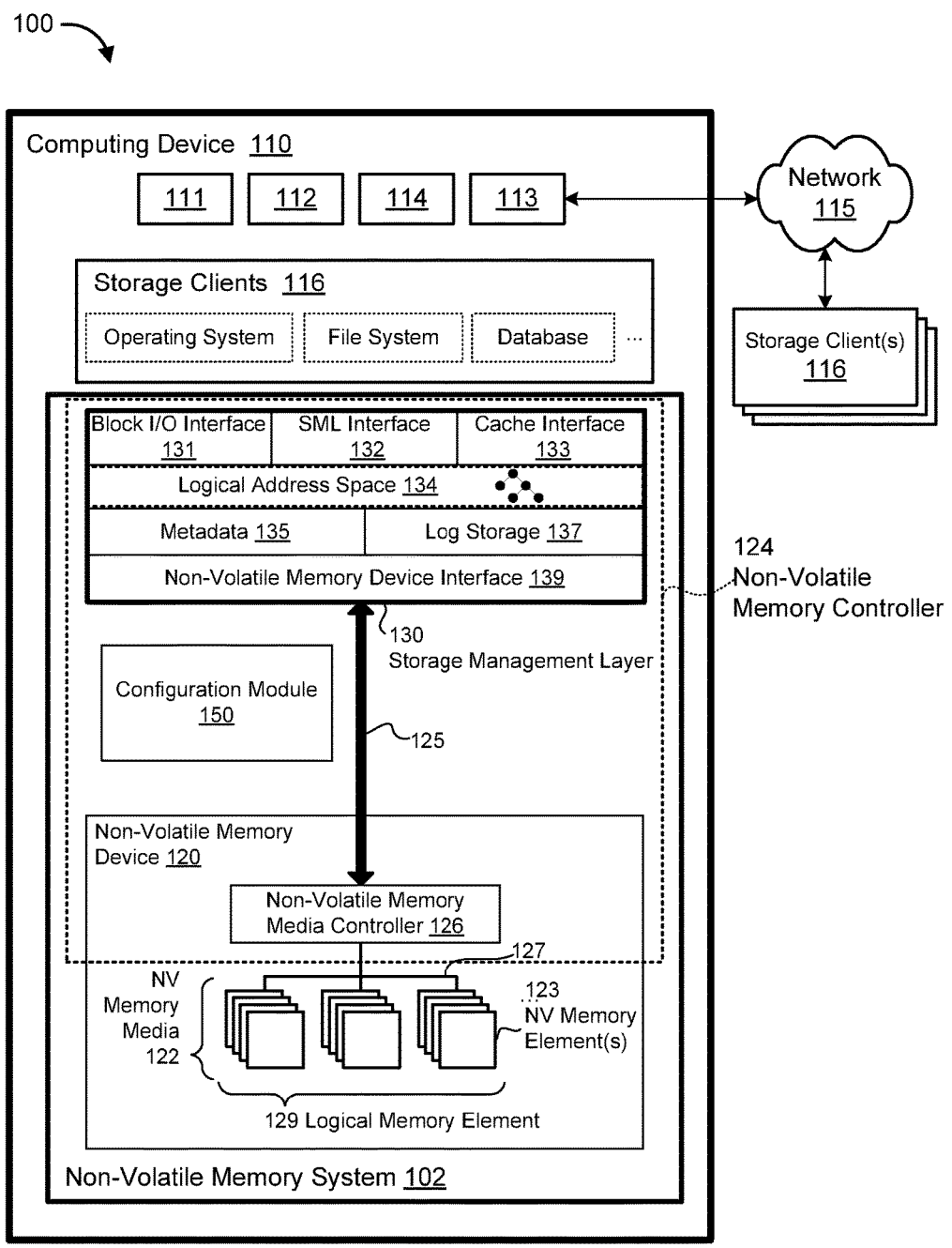
FIG. 1 is a schematic block diagram illustrating one embodiment of a system for model based configuration parameter management.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 for model based configuration parameter management. The system 100, in the depicted embodiment, comprises a configuration module 150. The configuration module 150 may be part of and/or in communication with one or more of a non-volatile memory controller 124, a non-volatile memory media controller 126, a device driver or storage management layer (SML) 130, or the like. The configuration module 150 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 124 to a communication network 115, such as an Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the configuration module 150 may be embodied as one or more computer readable instructions stored on the non-transitory storage media 114.

The non-volatile memory system 102, in the depicted embodiment, includes a configuration module 150. The configuration module 150, in one embodiment, is configured to determine, manage, and/or use one or more configuration parameters for the non-volatile memory media 122 described below, such as read voltage thresholds or the like. The configuration module 150, in certain embodiments, may determine a model for configuration parameters and use the model to determine values to use for a configuration parameter. The configuration module 150 may group, associate, or classify different storage regions and use the same one or more models to determine configuration parameter values for each storage region in the group.

By determining and using a model for configuration parameter values, in certain embodiments, the configuration module 150 may store the model (e.g., a slope and an intercept for a linear model) instead of storing values for the configuration parameter for each word line of a storage region. Further, in one embodiment, by grouping or classifying storage regions with one or more similar characteristics (e.g., retention times, program/erase cycle counts, error rates, or the like) the configuration module 150 may use the same one or more models for an entire group of storage regions. In this manner, in various embodiments, the configuration module 150 may store fewer configuration parameters, may efficiently determine values for configuration parameters using a model instead of determining each value by reading the media 122, or the like, resulting in a reduction in configuration parameter storage overhead and/or processing overhead, when compared to other systems and devices which may determine and/or store configuration parameters individually.

The configuration module 150, in one embodiment, may be part of, integrated with, and/or in communication with a controller 124, 126 for the non-volatile memory device 120. For example, a controller 124, 126 for the non-volatile memory elements 123, for storage elements 123, or the like may classify storage regions by retention time, program/erase cycle count, or the like; may determine different read voltage threshold models or other behavior models for different classifications; may use a read voltage threshold or other configuration parameter for a word line based on one of the models and a position of the word line within one of the storage regions; or the like. As described below, a controller may comprise a hardware controller 126 of a non-volatile memory or storage device 120 comprising a plurality of memory or storage elements 123 (e.g., an ASIC, an FPGA, or the like), a device driver or other computer executable program code for the non-volatile memory or storage device 120 comprising a plurality of memory or storage elements 123, stored on a computer readable storage medium 114, or the like.

As described below with regard to FIG. 2, the non-volatile memory device 120 may include one or more non-volatile memory controllers 124, 126 with a write data pipeline 240 and/or a read data pipeline 241 for the non-volatile memory media 122. In general, the one or more non-volatile memory controllers 124, 126 manage the non-volatile memory media 122, including determining configuration parameters for storage cells of the non-volatile memory media 122 and configuring the storage cells according to the configuration parameters.

As used herein, a configuration parameter for a set of storage cells or other non-volatile memory media 122 is a parameter that is modifiable by way of an interface. The interface may comprise a publicly known interface or a proprietary interface and may include use of particular command instructions and/or use of particular parameters, register settings, driver settings, controller settings, a particular set of command instruction sequences, or other differences from regular commands (general purpose commands) or settings used to interface with or manage the set of storage cells. Configuration parameters may relate to writing to or programming storage cells, reading from storage cells, erasing storage cells, managing storage cells, device driver or controller settings for storage cells, or the like. A configuration parameter for a set of storage cells may be associated with a device driver for the non-volatile memory device 120, with a non-volatile memory controller 124, 126, or the like, and may relate to how the device driver and/or non-volatile memory controller 124, 126 use, manage, and/or interact with the set of storage cells and/or the non-volatile memory media 122.

A configuration parameter, in certain embodiments, may include one or more storage thresholds, such as a read voltage threshold, a resistivity threshold, a programming threshold, an erase threshold, a hardware driver threshold, a storage controller threshold, or the like. The configuration parameter may be set once during initialization of the non-volatile memory media 122, dynamically with each command issued to the non-volatile memory media 122, during operation of the non-volatile memory media 122 in response to triggers such as events or time intervals, or the like.

In one embodiment, the configuration module 150 may comprise executable software code, such as a device driver, SML 130, or the like, stored on the computer readable storage media 114 for execution on the processor 111. In another embodiment the configuration module 150 may comprise logic hardware of one or more non-volatile memory devices 120, such as a non-volatile memory media controller 126, a non-volatile memory controller 124, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the configuration module 150 may include a combination of both executable software code and logic hardware.

In one embodiment, the configuration module 150 is configured to communicate, send or receive commands or storage requests, or the like to and from the SML 130 via a bus 125 or the like. The configuration module 150 may be further configured to transfer data to/from the SML 130 and/or storage clients 116 via the bus 125. Accordingly, the configuration module 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the configuration module 150 may receive storage requests as an API call from a storage client 116, as an IO-CTL command, or the like. The configuration module 150 is described in greater detail below with regard to FIGS. 3 and 4.

According to various embodiments, a non-volatile memory controller 124 comprising the configuration module 150 may manage one or more non-volatile memory devices 120. The non-volatile memory device(s) 120 may comprise recording, memory, and/or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, erase blocks, sectors, blocks, collections or sets of physical storage locations (e.g., logical pages, logical erase blocks, described below), or the like.

The non-volatile memory controller 124 may comprise an SML 130, which may present a logical address space 134 to one or more storage clients 116. One example of an SML is the Virtual Storage Layer® of SanDisk Corporation of Milpitas, Calif. Alternatively, each non-volatile memory device 120 may comprise a non-volatile memory media controller 126, which may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The SML 130 may maintain metadata 135, such as a forward index, to map logical addresses of the logical address space 134 to media storage locations on the non-volatile memory device(s) 120. The SML 130 may provide for arbitrary, any-to-any mappings from logical addresses to physical storage resources. As used herein, an "any-to any" mapping may map any logical address to any physical storage resource. Accordingly, there may be no predefined and/or preset mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML 130 may map logical addresses to physical data resources of any size and/or granularity, which may or may not correspond to the underlying data partitioning scheme of the non-volatile memory device(s) 120. For example, in some embodiments, the non-volatile memory controller 124 is configured to store data within logical memory units that are formed by logically combining a plurality of physical memory units, which may allow the non-volatile memory controller 124 to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (e.g., each non-volatile memory element being accessible in parallel). As used herein, a logical memory division refers to a set of two or more physical memory divisions, each physical memory division on a respective non-volatile memory element in the respective logical memory element.

The logical address space 134 presented by the SML 130 may have a logical capacity, which may correspond to the number of available logical addresses in the logical address space 134 and the size and/or granularity of the data referenced by the logical addresses. For example, the logical capacity of a logical address space 134 comprising $2^{32}$ unique logical addresses, each referencing 2048 bytes (2 KiB) of data may be $2^{43}$ bytes. As used herein, a kibibyte (KiB) refers to 1024 bytes. In some embodiments, the logical address space 134 may be thinly provisioned. As used herein, a "thinly provisioned" logical address space 134 refers to a logical address space 134 having a logical capacity that exceeds the physical capacity of the underlying non-volatile memory device(s) 120. For example, the SML 130 may present a 64-bit logical address space 134 to the storage clients 116 (e.g., a logical address space 134 referenced by 64-bit logical addresses), which may exceed the physical capacity of the underlying non-volatile memory devices 120. The large logical address space 134 may allow storage clients 116 to allocate and/or reference contiguous ranges of logical addresses, while reducing the chance of naming conflicts. The SML 130 may leverage the any-to-any mappings between logical addresses and physical storage resources to manage the logical address space 134 independently of the underlying physical storage devices 120. For example, the SML 130 may add and/or remove physical storage resources seamlessly, as needed, and without changing the logical addresses used by the storage clients 116.

The non-volatile memory controller 124 may be configured to store data in a contextual format. As used herein, a contextual format refers to a self-describing data format in which persistent contextual metadata is stored with the data on the physical storage media 122. The persistent contextual metadata provides context for the data with which it is stored. In certain embodiments, the persistent contextual metadata uniquely identifies the data with which the persistent contextual metadata is stored. For example, the persistent contextual metadata may uniquely identify a sector or block of data owned by a storage client 116 from other sectors or blocks of data owned by the storage client 116. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data.

The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media 122, a memory division index, or the like).

In some embodiments, the contextual data format may allow data context to be determined and/or reconstructed based upon the contents of the non-volatile memory media 122, and independently of other metadata, such as the arbitrary, any-to-any mappings discussed above. Since the media location of data is independent of the logical address of the data, it may be inefficient or impossible to determine the context of data based solely upon the media location or media address of the data. Storing data in a contextual format on the non-volatile memory media 122 may allow data context to be determined without reference to other metadata. For example, the contextual data format may allow the metadata to be reconstructed based only upon the contents of the non-volatile memory media 122 (e.g., reconstruct the any-to-any mappings between logical addresses and media locations).

In some embodiments, the non-volatile memory controller 124 may be configured to store data on one or more asymmetric, write-once media 122, such as solid-state storage media. As used herein, a "write once" storage medium refers to a storage medium that is reinitialized (e.g., erased) each time new data is written or programmed thereon. As used herein, an "asymmetric" storage medium refers to a storage medium 122 having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media).

The memory media 122 may be partitioned into memory divisions that can be erased as a group (e.g., erase blocks) in order to, inter alia, account for the asymmetric properties of the media 122 or the like. As such, modifying a single data segment in-place may require erasing the entire erase block comprising the data, and rewriting the modified data to the erase block, along with the original, unchanged data. This may result in inefficient "write amplification," which may excessively wear the media 122. Therefore, in some embodiments, the non-volatile memory controller 124 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the critical path of a write operation).

The non-volatile memory controller 124 may comprise one or more processes that operate outside of the regular path for servicing of storage operations (e.g., the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client 116, identifying the logical addresses of the request, performing one or more storage operations on non-volatile memory media 122, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller 124 comprises a groomer, which is configured to reclaim memory divisions (e.g., logical or physical erase blocks) for reuse, using a garbage collection or other storage capacity recovery process. The write out-of-place paradigm implemented by the non-volatile memory controller 124 may result in obsolete or invalid data remaining on the non-volatile memory media 122. For example, overwriting data X with data Y may result in storing Y on a new memory division (e.g., rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media 122 may accumulate a significant amount of invalid data.

A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller 124 may be further configured to store data in a log format. As described above, a log format refers to a data format that defines an ordered sequence of storage operations performed on a non-volatile memory media 122. In some embodiments, the log format comprises storing data in a predetermined sequence of media addresses of the non-volatile memory media 122 (e.g., within sequential pages and/or erase blocks of the media 122). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments the log format may comprise storing data in an "append only" paradigm. The non-volatile memory controller 124, using the log storage module 137 described below or the like, may maintain a current append point at a media address of the non-volatile memory device 120. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller 124 may identify the "next" available memory division (e.g., the next memory division that is initialized and ready to store data). The groomer may reclaim memory divisions comprising invalid, stale, and/or deleted data, to ensure that data may continue to be appended to the media log.

The log format described herein may allow valid data to be distinguished from invalid data based upon the contents of the non-volatile memory media 122, and independently of other metadata. As discussed above, invalid data may not be removed from the non-volatile memory media 122 until the memory division comprising the data is reclaimed. Therefore, multiple "versions" of data having the same context may exist on the non-volatile memory media 122 (e.g., multiple versions of data having the same logical addresses). The sequence indicators associated with the data may be used to distinguish invalid versions of data from the current, up-to-date version of the data; the data that is the most recent in the log is the current version, and previous versions may be identified as invalid.

The storage management layer 130 may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

The storage management layer 130 comprises and/or is communicatively coupled to one or more non-volatile memory devices 120. The one or more non-volatile memory devices 120 may include different types of non-volatile memory devices including, but not limited to: solid-state storage devices, hard drives, SAN storage resources, or the like. The one or more non-volatile memory devices 120 may comprise one or more respective non-volatile memory media controllers 126 and non-volatile memory media 122. As illustrated in FIG. 1, The SML 130 may provide access to the one or more non-volatile memory devices 120 via a traditional block I/O interface 131. Additionally, the SML 130 may provide access to enhanced functionality (e.g., a large, virtual address space 134) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the one or more non-volatile memory devices 120 and/or the one or more non-volatile memory media controllers 126.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations the on one or more non-volatile memory devices 120. The SML 130 may maintain metadata 135 comprising any-to-any mappings between logical addresses and media locations, as described above.

The SML 130 may further comprise a log storage module 137 that is configured to store data in a contextual, log format. The contextual, log data format may comprise associating data with persistent contextual metadata, such as the logical address of the data, or the like. The contextual, log format may further comprise associating data with respective sequence identifiers on the non-volatile memory media 122, which define an ordered sequence of storage operations performed on the one or more non-volatile memory devices 120, as described above.

The SML 130 may further comprise a non-volatile memory device interface 139 configured to transfer data, commands, and/or queries to the one or more non-volatile memory devices 120 over a bus 125, which may include, but is not limited to: a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 124 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile memory controller 124 comprises one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on and/or read data from the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (e.g., a page of each element of non-volatile memory media 122).

The non-volatile memory controller 124 may comprise an SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (e.g., through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log format. The contextual, log data format may comprise associating data with a logical address on the non-volatile memory media 122. The contextual, log format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
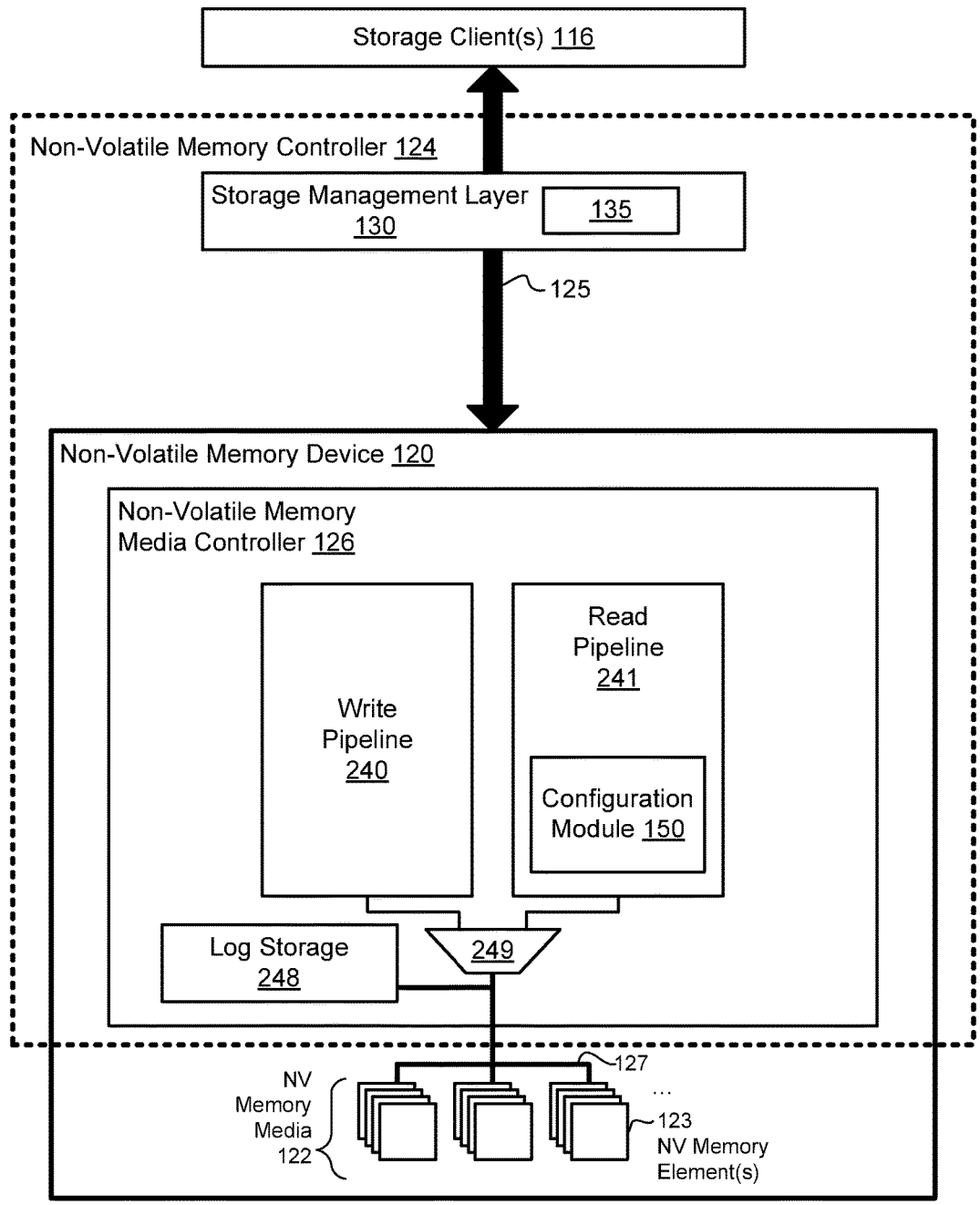
FIG. 2 is a schematic block diagram of a further embodiment of a system for model based configuration parameter management.

FIG. 2 depicts another embodiment of a non-volatile memory controller 124 configured to manage configuration parameters based on a model. The non-volatile memory device 120 may comprise a non-volatile memory media controller 126 and non-volatile memory media 122. The non-volatile memory media 122 may comprise a plurality of non-volatile memory elements 123, which may be communicatively coupled to the non-volatile memory media controller 126 via a bus 127, as described above.

The non-volatile memory media controller 126 may comprise a write pipeline 240 that is configured to store data on the non-volatile memory media 122 in a contextual format in response to requests received via the SML 130 or the like.

The requests may include and/or reference data to be stored on the non-volatile memory media 122, may include logical address(es) of the data, and so on. As described above, the contextual format may comprise storing a logical address of the data in association with the data on the non-volatile memory media 122. For example, the write pipeline 240 may be configured to format data into packets, and may include the logical address of the data in a packet header or other packet field. The write pipeline 240 may be configured to buffer data for storage on the non-volatile memory media 122. In some embodiments, the write pipeline 240 may comprise one or more synchronization buffers to synchronize a clock domain of the non-volatile memory media controller 126 with a clock domain of the non-volatile memory media 122 and/or bus 127.

The log storage module 248 may be configured to select media location(s) for the data and may provide addressing and/or control information to the non-volatile memory elements 123 via the bus 127. In some embodiments, the log storage module 248 is configured to store data sequentially in a log format within the non-volatile memory media. The log storage module 248 may be further configured to groom the non-volatile memory media, as described above. In certain embodiments the log storage module 248 is substantially similar to the log storage module 137 as described above. The log storage module 248 may be executed by the SML 130 and/or by the non-volatile memory media controller 126.

Upon writing data to the non-volatile memory media, the non-volatile memory media controller 126 may be configured to update metadata 135 (e.g., a forward index) to associate the logical address(es) of the data with the media address(es) of the data on the non-volatile memory media 122. In some embodiments, the metadata 135 may be maintained on the non-volatile memory media controller 126; for example, the metadata 135 may be stored on the non-volatile memory media 122, on a volatile memory (not shown), or the like. Alternatively, or in addition, the metadata 135 may be maintained within the SML 130 (e.g., on a volatile memory 112 of the computing device 110 of FIG. 1). In some embodiments, the metadata 135 may be maintained in a volatile memory by the SML 130, and may be periodically stored on the non-volatile memory media 122.

The non-volatile memory media controller 126 may further comprise a read pipeline 241 that is configured to read data from the non-volatile memory media 122 in response to read requests, using and/or in cooperation with the configuration module 150. The requests may comprise a logical address of the requested data, a media address of the requested data, or the like. The read pipeline 241 may be configured to read data stored in a contextual format from the non-volatile memory media 122 and to provide the data to the SML 130 and/or a storage client 116. The read pipeline 241 may be configured to determine the media address of the data using a logical address of the data and the metadata 135. Alternatively, or in addition, the SML 130 may determine the media address of the data and may include the media address in the request. The log storage module 248 may provide the media address to the non-volatile memory elements 123, and the data may stream into the read pipeline 241 via a buffer. The read pipeline 241 may comprise one or more read synchronization buffers for clock domain synchronization, as described above.

The non-volatile memory media controller 126 may further comprise a multiplexer 249 that is configured to selectively route data and/or commands to/from the write pipeline 240 and the read pipeline 241. In some embodiments, non-volatile memory media controller 126 may be configured to read data while filling a buffer of the write pipeline 240 and/or may interleave one or more storage operations on one or more banks of non-volatile memory elements 123 (not shown).

The read data pipeline 241, in certain embodiments, may include an ECC decoder that determines if a data error exists in ECC code words a requested packet received from the non-volatile memory media 122 by using ECC check bits stored with each ECC code word of the requested data. The ECC decoder may correct errors in the requested data if an error exists and the error is correctable using the ECC check bits. For example, if the ECC decoder can detect an error in six bits but can only correct three bit errors, the ECC decoder corrects ECC code words in the requested data with up to three bits in error. The ECC decoder may correct the bits in error by changing the bits in error to the correct one or zero state so that the requested data is identical to when it was written to the non-volatile memory media 122 and the ECC check bits were generated for the data.

In certain embodiments, the ECC decoder may provide error information for correctable errors to the configuration module 150, described below, such as locations of the bits in error, values for the bits in error, and/or other error information. For example, the ECC decoder may provide an error bias to the configuration module 150, indicating one or more bits of a data set that are in error, or the like. An error bias, as used herein, is a representation of one or more detected bit errors in a data set. In one embodiment, an error bias includes a location or position of a detected bit error in a data set. In another embodiment, an error bias includes a value for a detected bit error. A value for a detected error may include an error corrected value of a bit in error, an error value of the bit in error, or the like. For example, in one embodiment, the ECC decoder may provide the configuration module 150 with an uncorrected data set and an error bias indicating locations of detected bit errors and the configuration module 150 may determine a known bias by inverting or flipping the bits in those locations. In another embodiment, for example, the ECC decoder may provide the configuration module 150 with an error corrected data set and an error bias indicating locations of detected bit errors and the configuration module 150 may determine a read bias by inverting or flipping the bits in those locations.

If the ECC decoder determines that the requested packets contains more bits in error than the ECC can correct, the ECC decoder cannot correct the errors in the corrupted ECC code word of the requested data and sends an interrupt, an error, or the like. In one embodiment, the ECC decoder sends an interrupt with a message indicating that the requested data is in error. The message may include information indicating that the ECC decoder cannot correct the errors or the inability of the ECC decoder to correct the errors may be implied. In another embodiment, the ECC decoder may send one or more corrupted ECC code words with the interrupt and/or the message.

In one embodiment, a corrupted ECC code word or portion of a corrupted ECC code word that cannot be corrected by the ECC decoder may be read by the media controller 126, corrected by the media controller 126, by a device driver (e.g., the SML 130), or the like, and returned to the ECC decoder for further processing by the read data pipeline 241. In one embodiment, a corrupted ECC code word or portion of a corrupted ECC code word may be sent to the device or storage client 116 requesting the data. The requesting device 110 may correct the ECC code word or replace the data using another copy, such as a backup or mirror copy, and then may use the replacement data or return the replacement data to the read data pipeline 241. The requesting device 110 may use header information or other metadata for the requested data error to identify replacement data. In another embodiment, the non-volatile memory controller 124, 126 stores data using some type of RAID and is able to recover the corrupted data. In another embodiment, the ECC decoder sends an interrupt and/or message and the requesting device 110 fails the read operation associated with the requested data.

In one embodiment, the non-volatile memory controller 124, 126 includes a configuration module 150 (e.g., in the read pipeline 241 or the like) that sets and adjusts configuration parameters for the non-volatile memory media 122, such as read voltage thresholds or the like. In a further embodiment, the configuration module 150 may be integrated with the non-volatile memory media 122 such that it operates independently from the read data pipeline 241 and/or the write data pipeline 240. In certain embodiments, the configuration module 150 proactively determines one or more configuration parameters for storage cells of the non-volatile memory media 122 based on media characteristics for the storage cells in an open loop manner, with little or no feedback from the storage cells. In one embodiment, the configuration module 150 is in communication with the storage control bus and/or the storage bus controller to configure storage cells of the non-volatile memory media 122 to use various configuration parameters. In another embodiment, the configuration module 150 manages configuration parameters and/or settings for the non-volatile memory controller 124, 126 and or for the non-volatile memory device 120.

In other embodiments, the configuration module 150 may receive a data set from the non-volatile memory media 122, either directly or indirectly, to determine configuration parameters for corresponding storage cells in a closed loop manner, with read data sets as feedback from the storage cells. In certain embodiments, the configuration module 150 may receive data from the ECC decoder. In a further embodiment, the configuration module 150 may receive a data set from a read synchronization buffer, directly from a storage I/O bus, or otherwise.

In general, the configuration module 150 sets and adjusts one or more configuration parameters for one or more storage cells from the non-volatile memory media 122, such as setting and adjusting read voltage thresholds, resistivity thresholds, programming thresholds, erase thresholds, or the like. A read voltage threshold is a voltage level that separates or defines discrete values stored in the storage cells of the non-volatile memory media 122. Different non-volatile memory technologies may use different thresholds other than voltages to distinguish between discrete states. Phase change RAM or PRAM, for example, stores data in chalcogenide glass that has different electrical resistivity in different states. For PRAM, the configuration module 150 may determine, set, and/or adjust resistivity thresholds that distinguish between discrete storage states. The configuration module 150 may determine, set, and/or adjust resistivity thresholds or other configuration parameters in a substantially similar manner to that described herein with regard to read voltage thresholds.

For single level cell (SLC) storage cells that store a single binary value, the read voltage threshold is the boundary between a binary one state and a binary zero state. For example, in one embodiment, a storage cell with a read voltage level above the read voltage threshold logically stores a binary one while a storage cell with a read voltage level below the read voltage threshold logically stores a binary zero, or vice versa depending on an encoding for the storage cells. Other types of storage cells, such as multilevel cell (MLC) storage cells, triple level cell (TLC) storage cells, quad level cell (QLC) storage cells, or the like may have multiple read voltage thresholds, to distinguish between more than two discrete states.

For example, in one embodiment, MLC storage cells that store two bits per cell may have three read voltage thresholds, separating binary values of 11, 01, 00, and 10, depending on an encoding of the storage cells. The three example read voltage thresholds may be x volts, y volts, and z volts, described in greater detail below with regard to the read voltage thresholds 662 of FIGS. 6A-6C. If the voltage read from a storage cell falls between Vmin and x volts, a binary 11 state is indicated. In certain embodiments, Vmin may be a negative voltage. If the voltage read from a storage cell falls between x volts and y volts, a binary 01 state is indicated. If the voltage read from a storage cell falls between y volts and z volts, a binary 00 state is indicated. If the voltage read from a storage cell falls between z volts and Vmax volts, a binary 10 state is indicated. In other embodiments, other encodings may be used, physical and/or electrical values may be flipped or inverted to determine logical values, or the like.

The voltages for Vmin, Vmax, x, y, z may vary based on the manufacturer of the storage cells. Read voltages, in one embodiment, for example, may range between −3.5 and 5.8 volts, or between another predefined range of voltages. Similarly, the order of binary state changes 11, 01, 00, and 10 relative to read voltage thresholds may vary based on the encoding type used, such as a Gray code encoding type, a binary code encoding type, or the like. Example encoding types are described below with regard to FIGS. 6A-6C. As described in greater detail with regard to FIGS. 6A-6B, although a single MLC storage cell stores multiple bits, bits from a single storage cell may not have adjacent addresses, and may be included in different physical pages, logical pages, or the like.

Accordingly, in various embodiments, the configuration module 150 may manage configuration parameters, such as read voltage thresholds or other storage thresholds, at various granularities, such as per abode/storage state, per page (logical or physical), per erase block (logical or physical), per set of pages, per ECC chunk/code word, per word line, per chip, per die, per die plane, or the like. As described in greater detail below, in certain embodiments, the configuration module 150 may determine and/or manage configuration parameters, such as read voltage thresholds, using one or more models (e.g., a linear model, a quadratic polynomial or another degree polynomial model).

Adjustments for a configuration parameter may fit a model due to one or more physical, electrical, designed, and/or natural properties of the non-volatile memory media 122 (e.g., an architecture, a geometry, or the like). For example, in one embodiment, adjustments for a configuration parameter, such as a read voltage threshold, may follow a substantially linear model with a negative slope, so that values for the configuration parameter, adjustments for the configuration parameter, or the like decrease as word line positions within a storage region increase. In certain embodiments, a negative slope may be caused by increased instances of program disturb experienced by word lines earlier in the page programming order of a storage region, which may experience program disturb effects with each subsequent page and/or word line which is programmed in the page programming order. For example, if a page programming order begins at page 0 and proceeds in increasing numerical order, a word line associated with page 0 may experience the most instances of program disturb while a word line associated with a last or final page in the page programming order may experience the least instances of program disturb.

In certain embodiments, instead of or in addition to referring to a boundary between discrete values, a read voltage threshold may comprise a range of voltages (e.g., a maximum and a minimum) that indicate a value, or the like. A voltage threshold comprising a range may be adjusted by changing a boundary at either end, or at both ends, of the range. The read voltage thresholds or other configuration parameters for the non-volatile memory media 122, in one embodiment, may initially be set at a default level that may be defined by a manufacturer, vendor, or the like. Often such configuration parameter default levels may be set to accommodate a large range of general purpose uses of the non-volatile memory media 122.

The configuration module 150, in certain embodiments, overrides the default level for one or more configuration parameters, setting the one or more configuration parameters to a different level based on one or more models determined for the non-volatile memory media 122. The configuration module 150 may set the configuration parameters to levels that decrease the amount of errors that the non-volatile memory media 122 encounters when compared to the default level, to levels that increase the amount of errors that may be detected and corrected when compared to the default level, to levels that increase the number of input/output operations per second ("IOPS") of the non-volatile memory media 122 when compared to the default level, to levels that increase the usable life of the non-volatile memory media 122 when compared to the default level, to levels associated with a model to reduce the storage and/or processing overhead associated with managing the levels, or to levels that otherwise improves the utility and/or efficiency of the non-volatile memory media 122 when compared to the default level.

The read voltage levels of storage cells, and other configuration parameters, can also shift over time, due to leakage and other disturbances of the non-volatile memory media 122 (e.g., read disturb, program disturb). The rate of leakage can also increase with the wear and age of the non-volatile memory media 122. If the read voltage level of a storage cell shifts past the read voltage threshold, a data error occurs, as the value of the data read from the storage cell is different than the value of the data written to the storage cell. The configuration module 150, in one embodiment, adjusts a read voltage threshold or other configuration parameter for one or more storage cells of the non-volatile memory media 122 to compensate for shifts in the read voltage levels of the storage cells. By proactively and/or dynamically adjusting read voltage thresholds or other configuration parameters, the configuration module 150 may increase the retention rate for and/or the reliability of data stored in the non-volatile memory media 122 and extend the useable lifetime of the non-volatile memory media 122.

The configuration module 150, in one embodiment, determines and/or uses a model to adjust or set a read voltage threshold or other configuration parameter. As used herein, a model comprises a representation of a relationship between one or more variables or indeterminates. For example, the configuration module 150, in certain embodiments, may determine and/or use a model defining a value and/or adjustment for a configuration parameter for a page and/or word line, based on a physical location of the page and/or word line (e.g., by entering an address or other identifier for a page or word line into the model, the configuration module 150 may determine a value and/or adjustment for the configuration parameter).

Figure 7:
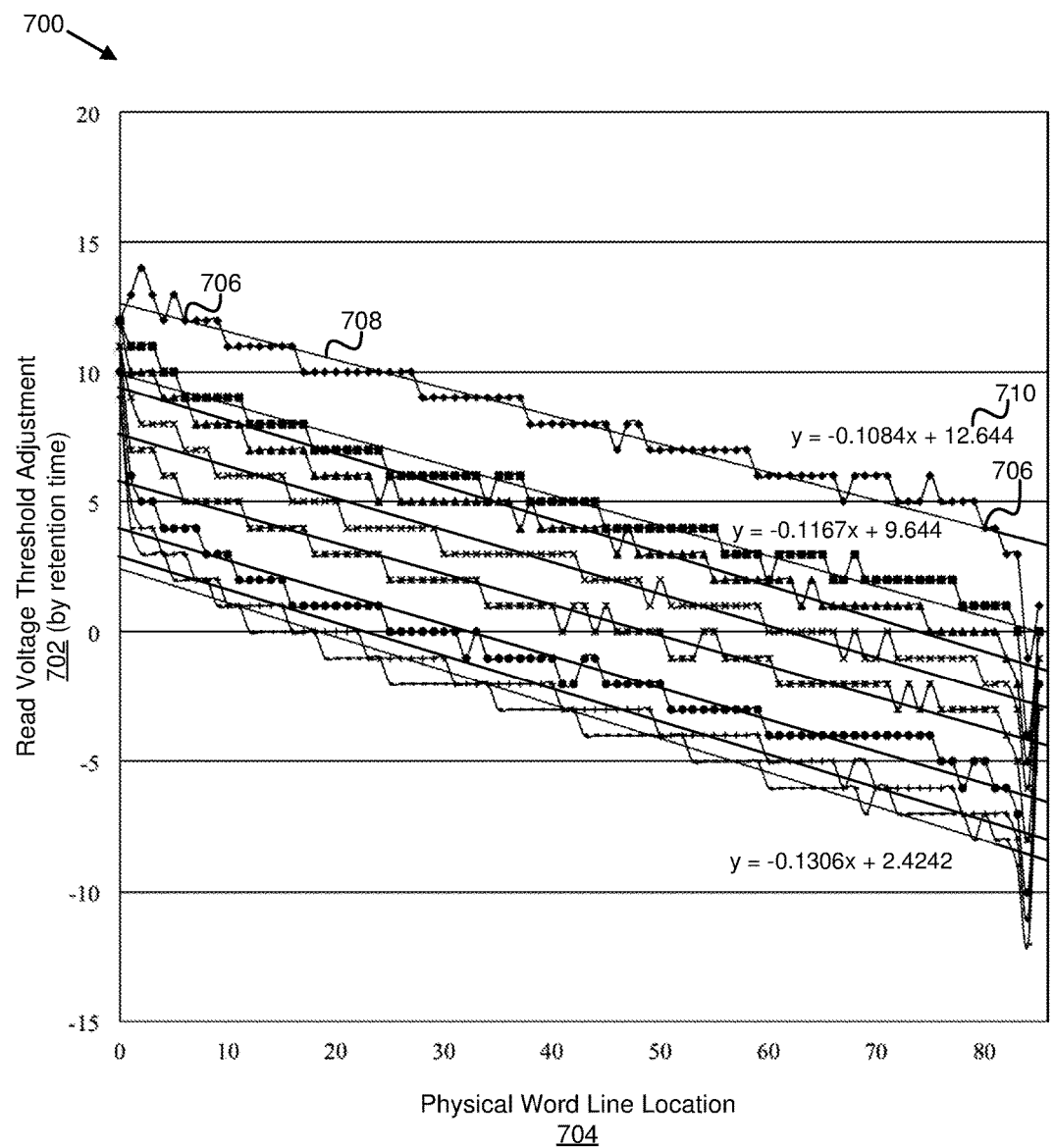
FIG. 7 is a graph illustrating one embodiment of configuration parameter models for a set of word lines.

A model may comprise a polynomial with one or more levels (e.g., linear with a single level or X, quadratic with two levels or $X^2$, and so on). A model, in certain embodiments, may comprise multiple variables or indeterminates (e.g., location of a page or word line, retention time, program/erase "P/E" cycle count, or the like). A model may include one or more coefficients, exponents, operators, operands, or the like modifying or otherwise associated with the one or more variables or indeterminates. Certain terms of a model may be inferred or known and not stored by the configuration module 150 (e.g., the configuration module 150 may store a slope and an intercept for a linear model). A model may comprise a function, an expression, a formula, a statistical model, a probability distribution, a polynomial, or the like. Non-limiting examples of certain embodiments of models are depicted in FIGS. 7, 8A, and 8B and described below.

A behavior model, as used herein, comprises a model associated with a use of, a property of, and/or a characteristic of the non-volatile memory media 122, such as a model of configuration parameter adjustments, a model of voltage drift, a model of disturb effects, or the like. A behavior model may represent how storage cells of the non-volatile memory media 122 have reacted, are expected to react, and/or may react to an event or trigger. One embodiment of a behavior model is a read voltage threshold model. A read voltage threshold model, as used herein, identifies an actual or estimated relationship between a physical address or location of a page or word line and a read voltage threshold value and/or read voltage threshold adjustment for the page or word line. A read voltage threshold model may represent a preference, probability, tendency, likelihood, or desirability of storage cells to exhibit a specific pattern of read voltage thresholds and/or read voltage threshold adjustments. A model may be based on a natural property, a designed attribute, a property of an operation on, storage cells of the non-volatile memory media 122, or may be due to a random occurrence.

Figure 3:
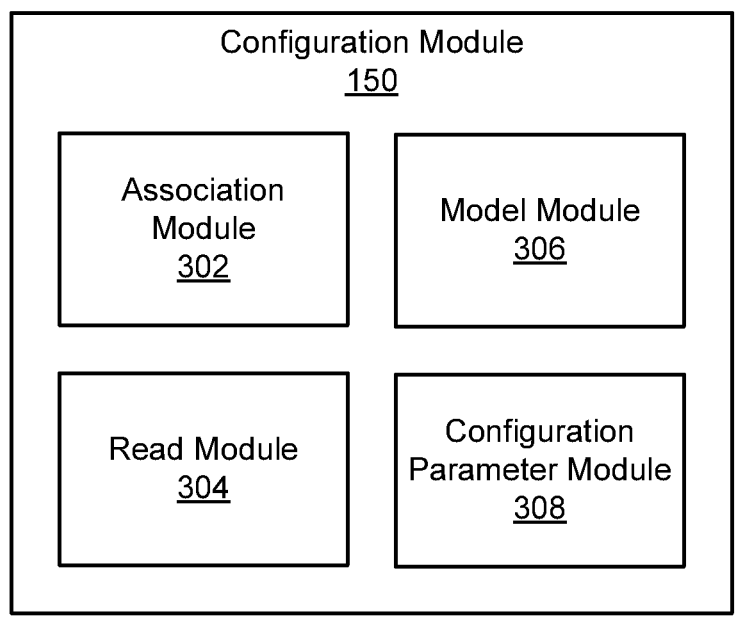
FIG. 3 is a schematic block diagram illustrating one embodiment of a configuration module.

FIG. 3 depicts one embodiment of a configuration module 150. The configuration module 150 may be substantially similar to the configuration module 150 described above with regard to FIGS. 1 and/or 2. In general, as described above, the configuration module 150 determines, manages, and/or adjusts values for one or more configuration parameters using one or more models. In the depicted embodiment, the configuration module 150 includes an association module 302, a read module 304, a model module 306, and a configuration parameter module 308.

In one embodiment, the association module 302 is configured to group, associate, or classify storage regions (e.g., erase blocks) of a non-volatile memory medium 122 based on one or more storage media characteristics of the memory medium 122. A storage region, as used herein, comprises a discrete set or group of storage cells, such as an erase block, a page, a word line, an ECC code word, a die, a die plane, a chip, a package, or the like. In certain embodiments, the association module 302 may group, associate, or classify storage regions so that the configuration module 150 may use the same model or models for configuration parameters for the entire group or set of storage regions, thereby reducing the storage and/or processing overhead for managing configuration parameters.

A storage media characteristic of a storage region, as used herein, comprises an attribute, statistic, or other descriptor associated with the storage region. A storage media characteristic for a storage region may be substantially static or may be dynamic and change over time. A storage media characteristic for a storage region, in one embodiment, may describe or be associated with more than one storage region. For example, in certain embodiments, a storage media characteristic for a block may include or relate to the non-volatile memory element 123 (e.g., chip, die, die plane, package, or the like) that includes the block.

In a further embodiment, a storage media characteristic for a storage region may be associated with an identifier of the non-volatile memory element 123 that includes the storage region, or may be associated with the make, model, manufacturer, vendor, product version, or the like of the non-volatile memory element 123. In another embodiment, a storage media characteristic for a storage region may describe an attribute or statistic particular to that storage region, such as a retention time since a previous write for the storage region, a program/erase cycle count for the storage region, a read count for the storage region or for pages in the storage region, an erase dwell time between a previous erase and a previous write for the storage region, an error statistic for the storage region, an indicator of whether the storage region is partially or fully programmed, or the like. A storage media characteristic, in a further embodiment, may include or relate to an environmental condition or a use of the non-volatile memory device 120 and/or of the non-volatile memory media 122, such as a temperature, a use case (e.g., a cache use case, an archival use case, a server use case, an enterprise use case, a consumer use case, etc.), or the like.

In one embodiment, a storage media characteristic for a storage region may be a factor that affects an error rate for the storage region, a factor that affects a configuration parameter for the storage region. For example, in one embodiment, a retention time (e.g., the amount of time since data was written to the storage region), a program/erase cycle count (e.g., the number of times that a storage region has been programmed and subsequently erased), or the like may affect the stored voltage levels of the storage region, causing errors if the associated read voltage thresholds are not adjusted over time to compensate.

Different storage media characteristics may affect configuration parameters differently in different types of non-volatile memory media, such as flash memory, PRAM or PCM, or the like. As described below, in certain embodiments, a control module 404 may control variation of one or more storage media characteristics to reduce variations between storage regions so that the association module 302 may group storage regions (e.g., erase blocks) by a single storage media characteristic, by fewer storage media characteristics, or the like and the configuration module 150 may use per-group models for configuration parameters, instead of per-block configuration parameters or the like.

In certain embodiments, to reduce the overhead of tracking storage media characteristics and/or configuration parameters at a fine grain, such as for each storage cell, each page, each word line, each erase block, or each other storage region, the configuration module 150 may determine, select, or otherwise manage configuration parameters and/or models for groups or sets of storage regions with one or more similar storage media characteristics. For example, the configuration module 150 may determine and manage configuration parameters, and/or configuration parameter models, for groups or sets of physical erase blocks, logical erase blocks, word lines, pages, ECC chunks/code words, chips, die, planes in a die, or other storage regions, as determined by the association module 302. The association module 302 may group erase blocks, word lines, pages, die, die planes, chips, packages, or other storage regions that have similar storage media characteristics, such as similar error rates (e.g., RBER, UBER), similar retention times, similar ages, similar program/erase counts, similar physical media locations, similar architectures, or the like, and determine different configuration parameter settings and/or configuration parameter models for the different groups or sets.

For example, in one embodiment, the association module 302 may group, associate, or classify erase blocks of a die or die plane by retention time, and use a different model for each group to determine configuration parameters for the groups. Different groups or sets identified by the association module 302 may have different error rates, such as RBERs, UBERs, or the like, different voltage drift, different read voltage threshold or other configuration parameter adjustments and the model module 306 may determine different models for different groups or sets as described in greater detail below.

The association module 302, in certain embodiments, may group, associate, and/or classify storage regions into groups or sets with similar storage media characteristics, such as error rates, retention times, ages, program/erase counts, physical media locations, architectures, or the like, and the model module 306 may determine different configuration parameter models for the different groups or sets. Even when managing or determining configuration parameters by sets or groups of storage regions, in certain embodiments, the model module 306, as described below, may determine different configuration parameter models for different abodes/storage states of the storage cells within a set or group, or may determine a single model used for multiple abodes/storage states within the set or group.

For example, for MLC storage cells, in one embodiment, the model module 306 may determine different models for settings for and/or adjustments to the R1, R2, and R3 read voltage thresholds for a set of erase blocks determined by the association module 302. In another embodiment, the model module 306 may determine a single model for settings for and/or adjustments to one of the R1, R2, and R3 read voltage thresholds (e.g., a model for R1, a model for R2, a model for R3) for a set of erase blocks determined by the association module 302, and the configuration parameter module 308 may determine the other read voltage thresholds based on the model, using different predefined offsets or the like (e.g., determining R1 and R3 as offsets from R2, determining R2 and R3 as offsets from R1, determining R1 and R2 as offsets from R3, or the like). The model module 306 is described in greater detail below. While three read voltage thresholds R1, R2, R3 are described as one example embodiment (e.g., MLC read voltage thresholds 662a-c of FIGS. 6A and 6B), in other embodiments, storage cells may have different numbers of storage states/abodes, read voltage thresholds, or other configuration parameters (e.g., TLC read voltage thresholds 662a-g of FIG. 6C).

The association module 302, in one embodiment, is configured to group erase blocks or other storage regions of the non-volatile memory medium 122 based on one or more storage media characteristics other than storage media characteristics for which the control module 404 manages differences or controls variation. For example, in one embodiment, the association module 302 may group blocks of the non-volatile storage medium based on one or more additional factors affecting the error rate, affecting voltage drift, affecting read voltage thresholds, or the like. In certain embodiments, the control module 404 may control or manage variation in P/E counts for erase blocks of a die, die plane, chip, package, or other storage element 123 and the association module 302 may categorize the erase blocks of the storage elements into groups based on retention times.

As used herein, an "other" or "additional" factor or storage media characteristic refers to a factor or storage media characteristic other than the factors or storage media characteristics for which the control module 404, described below, controls variation or manages differences. For example, in one embodiment, the control module 404 may control variation in program/erase cycle counts and/or erase dwell times, and the association module 302 may group, classify, or categorize blocks based on other or additional storage media characteristics, which may include a retention time, a die-to-die variation (e.g., a storage media characteristic that varies from die to die, such as an identifier of the die, temperature of the die, or the like), a partially programmed state (e.g., an indicator of whether a block is partially or fully programmed), or the like. With the variation of certain factors controlled by the control module 404, using an association module 302 to group blocks based on other or additional factors may allow configuration parameter models to be determined and managed on a per-group basis.

In certain embodiments, the additional factors that the association module 302 uses to group storage regions such as erase blocks may include a retention time for the storage regions of the non-volatile memory medium 122. As used herein, a "retention time" for a storage region such as an erase block may refer to an elapsed time since writing the storage region's contents (e.g., data) to the storage region. A retention time may be measured or determined in various ways. In one embodiment, a retention time may be a real (e.g., wall-clock) time, determined by comparing a current time to a time-stamp recorded when writing to a storage region. In another embodiment, a retention time may be measured in terms of time elapsed while the non-volatile memory device 120 is in use or powered on, and the retention time may be determined by a retention time counter for a storage region that increments while the non-volatile memory device 120 is in use or powered on (e.g., a number of clock cycles, or the like). In certain embodiments, a storage region (e.g., an erase block) may include multiple pages, and data may be written to different pages at different times, so a retention time for the storage region may include a minimum retention time, maximum retention time, average retention time, or the like, for pages in the storage region.

As used herein, "grouping" storage regions such as erase blocks refers to associating the storage regions with various groups, or otherwise classifying or categorizing the blocks into groups. For example, in one embodiment, the association module 302 may group erase blocks or other storage regions by recording a group number (or other group identifier) in a header or footer for each erase block. In another embodiment, the association module 302 may group erase blocks or other storage regions by storing a table or other data structure that records which storage regions belong to which groups. In certain embodiments, the association module 302 may group storage regions such as erase blocks by defining values or ranges for the one or more storage media characteristics on which the groups are based.

For example, in one embodiment, the association module 302 may assign different ranges of retention times to different groups, and the configuration module 150 may treat each erase block or other storage region with a retention time in a group's range as a member of that group, without the association module 302 explicitly recording which blocks belong to the group. Thus, in various embodiments, the association module 302 may "group" or "classify" erase blocks or other storage regions by establishing a set of groups based on one or more storage media characteristics, by explicitly recording storage regions' membership in the groups, by informing another module or entity what group a storage region belongs to (and/or how the groups are defined) without explicitly recording what storage regions belong to what groups, by reassigning a storage region to a different group based on a change in a storage media characteristic for the storage region, or the like.

In one embodiment, the association module 302 may group storage regions based on retention times for the storage regions, as described above. In a further embodiment, the association module 302 may group storage regions using larger ranges of retention times for groups associated with longer retention times. For example, in one embodiment, one group associated with a shorter retention time may include erase blocks with a retention time between 1 and 2 hours (e.g., a 1 hour range), and another group associated with a longer retention time may include erase blocks with a retention time between 16 and 32 hours (e.g., a 16 hour range). In general, grouping erase blocks or other storage regions based on a storage media characteristic range (e.g., a range of retention times) may allow a per-group configuration parameter model or models to be used for erase blocks that vary within the range. Thus, in certain embodiments, using a range for grouping erase blocks may facilitate a less complicated (e.g., per-group rather than per-block) configuration parameter scheme by defining a floor for the level of granularity, or an acceptable amount of variation for blocks using the same configuration parameter model or set of configuration parameter models (e.g., one or more read voltage threshold models).

In some embodiments, the size of a range for grouping storage regions based on one or more storage media characteristics may be based on a sensitivity of an error rate or stored voltage to changes in that storage media characteristic. For example, in one embodiment, an error rate for a block may be sensitive to small changes in retention time when retention times are low, stored voltages may drift at a higher rate when retention times are low, or the like. For example, an error rate for an erase block with a retention time of one hour may change significantly after an additional hour of retention time, due to a large change in a stored voltage level or the like. However, in a further embodiment, a rate of change in an error rate, a rate of voltage drift, or the like for an erase block may decrease as retention times increase. For example, an error rate for an erase block with a retention time of one month may not change significantly after an additional hour of retention time, but may change significantly after an additional month. Thus, in various embodiments, changing the size of ranges that define the groups may allow larger variations for blocks within a group, and larger groups for per-group configuration parameter models, when error rates are less sensitive to the larger variations.

In one embodiment, grouping blocks using larger ranges of retention times for groups associated with larger/longer retention times may involve similarly-sized retention time ranges for some groups, but may involve at least one larger retention time range for at least one group associated with a larger retention time. In certain embodiments, ranges of retention times for different groups may be based on logarithms of retention times. For example, in one embodiment, retention time boundaries between different groups may be uniformly spaced on a logarithmic scale (e.g., each retention time boundary may be a fixed multiple of the previous boundary), a power of two scale, or another nonlinear scale.

For example, in one embodiment, the association module 302 groups erase blocks of a die, die plane, chip, package, or other storage element 123 into groups by retention time (e.g., an amount of time since data has been written to the erase blocks), with boundaries for the groups spaced by a power of two (e.g., 0-1 hours, 1-2 hours, 2-4 hours, 4-8 hours, 8-16 hours, 16-32 hours, 32-64 hours, 64-128 hours, 128-256 hours, 256-512 hours, 512-1024 hours, 1024-2048, or the like). The association module 302, in one embodiment, may determine different sets of groups, based on retention time or another storage media characteristic, for different storage elements 123, such as die, die planes, chips, packages, or the like, so that each storage element 123 has a distinct set of groups of storage regions, such as erase blocks.

As described below, the model module 306 may determine different models for different groups or sets of storage regions (e.g., erase blocks), so that each storage element 123 is associated with a set of models associated with different groups, at least one model for determining settings or values for a configuration parameter for an associated group. In this manner, as described below, the model module 306 may determine a model for one storage region that the configuration parameter module 308 may use for other storage regions in the same group, without determining separate or individual models for the other storage regions. The association module 302 may regroup or re-determine groups or sets of storage regions in response to a trigger or other event, as described below with regard to the trigger module 402.

In one embodiment, the read module 304 performs read operations, samples, or otherwise reads data from at least two sets of cells of a storage region, such as pages or word lines of an erase block or the like. The read module 304, in certain embodiments, may read or sample data from at least one storage region (e.g., erase block) from each group of a storage element 123 (e.g., die, die plane, chip, package), so that the model module 306 described below may determine different models for each group of the storage element 123. In another embodiment, the read module 304 may read or sample data from at least two sets of cells of a storage region of a storage element 123 and the model module 306 may determine a single model for the storage element 123 (e.g., a storage element 123 may comprise a single group).

The read module 304, in one embodiment, is configured to read or sample data from at least two word lines or other data sets of an erase block, in order to give the model module 306 enough data points to determine a model. In a further embodiment, the read module 304 may read or sample data from more than two word lines or other data sets (e.g., three word lines, four word lines, five word lines, ten word lines, twenty word lines, all word lines of an erase block). For example, samples from two word lines may be sufficient for a flat, linear model, while samples from more word lines may be useful for a higher level polynomial model with one or more curves.

In certain embodiments, the read module 304 is configured to read or sample data from predetermined data sets (e.g., pages, word lines, ECC code words), data sets in predefined locations, or the like. For example, the read module 304 may read or sample data from pages or word lines separated from ends of an erase block by at least one word line (e.g., word lines 9 and 75 or the like, for an erase block with 86 word lines). Selecting pages or word lines removed from edges or ends of an erase block, in one embodiment, may provide a more accurate model than a model based on word lines at the edges or ends of the erase block, which may suffer from different disturb effects, different rates of voltage drift, or the like than internal word lines.

A designer, manufacturer, vendor, or the like for the non-volatile memory device 120, in certain embodiments, may determine and/or define which pages or word lines the read module 304 reads or samples, based on experimentation or testing, based on a characterization or analysis of the non-volatile memory media 122, or the like. In a further embodiment, the read module 304 may dynamically determine or adjust which pages or word lines the read module 304 reads or samples, by reading or sampling pages or word lines from one or more erase blocks and determining which pages or word lines are most indicative of an accurate model for the erase block, or the like.

In one embodiment, the read module 304 may read or sample data from multiple storage regions (e.g., erase blocks) in the same group or set, so that the model module 306 may determine a model for the group or set based on the read or sampled data from the multiple storage region (e.g., averaging different configuration parameter adjustments, combining multiple models, or the like). In certain embodiments, the association module 302 may determine which pages or word lines and/or which erase blocks or other storage regions the read module 304 samples, based on the classification or grouping performed by the association module 302.

The read module 304, in certain embodiments, reads or samples data in response to a trigger or event. For example, the read module 304 may read or sample data in response to a storage media characteristic satisfying a threshold (e.g., a storage media characteristic of the non-volatile memory media 122, of a non-volatile memory element 123, of a group or set of storage regions such as erase blocks, or the like). In one embodiment, the read module 304 reads or samples data in response to one or more memory elements 123 satisfying a threshold for a storage media characteristic that the control module 404 controls or manages. For example, in certain embodiments, the read module 304 samples or reads data so the model module 306 may determine or update one or more models in response to a P/E cycle count (e.g., a number of times an erase block has been programmed and erased) or another storage media characteristic (e.g., retention time, erase dwell time, error rate, voltage drift) satisfying a threshold. In this manner, the read module 304 may resample or reread data periodically, every N number of P/E cycles or the like, allowing the model module 306 to update or re-determine models periodically as storage characteristics change over time, as described in greater detail below with regard to the trigger module 402.

The read module 304, in one embodiment, rereads and/or resamples data from one or more pages or word lines multiple times using different configuration parameter settings (e.g., different read voltage thresholds), to allow the configuration parameter module 308 to determine a correct and/or optimal setting for the configuration parameter, as described below. For example, the read module 304 may use a soft read command, may perform multiple reads with different read voltage thresholds around a previous or default read voltage threshold, or the like.

A soft read may be different than a standard or regular read operation. A standard or regular read, also known as a hard read, returns a boolean value indicating whether a hard read threshold was satisfied. In contrast, a soft read returns more information than just a single boolean value. In some embodiments, a soft read returns a probability or confidence that the corresponding boolean value is accurate. For example, in certain embodiments, a soft read operation may result in soft read information comprising a vector that includes both a direction indicating bit value (e.g., positive for a binary zero or negative for a binary one) and a magnitude. The magnitude may indicate a probability or confidence that the direction indicating bit value is correct. In some embodiments, a soft read returns a multiple bit value indicating whether multiple soft read thresholds are satisfied. In other embodiments, a soft read returns information regarding a sub-state in which a stored read voltage level for the cell resides.

In some embodiments, a storage cell comprises a multi-level cell (MLC) or a triple-level cell (TLC) and the read module 304 is configured to perform a first set of soft read operations using a first set of soft read voltage thresholds and a second set of soft read operations using a second set of soft read voltage thresholds. Additional sets of soft read operations (e.g., third, fourth, or the like) using additional sets of soft red voltage thresholds may be performed according to a nature or design of the storage cell. A first set of soft red voltage thresholds may be spaced at a first interval and a second set of soft read voltage thresholds may be spaced at a second interval.

In certain embodiments, the read module 304 is configured to perform different soft read operations using different granularities of soft read voltage thresholds. For example, a first soft read operation using broader read voltage spacing may be performed and a subsequent soft read operation using narrower read voltage spacing may be performed. The first soft read operation and the subsequent soft read operation may be centered on the same hard read threshold or on different hard read thresholds.

In some embodiments, the read module 304 is configured to issue a soft read command to the non-volatile memory media 122 and receive soft read information in response. The read module 304 may specify the number of soft read operations that should be performed, the soft read thresholds, the soft read threshold spacing, and/or other parameters used to obtain the soft read information.

A soft read command, as used herein, comprises an instruction to perform a soft read operation on a storage cell or group of storage cells. In some embodiments, soft read commands may be provided by the non-volatile memory device 120, the non-volatile memory media controller 126, the non-volatile memory media 122, or the like. In one embodiment, a single soft read command may comprise an instruction to perform a plurality of sub-read operations in response to the single soft read command, for example three sub-read operations, five soft-read operations, or the like. Each soft read operation may itself comprise or cause a plurality of sub-read operations to be performed on the associated set of storage cells (e.g., a logical or physical page, a word line, an error correcting code (ECC) chunk/code word, or another storage region).

Sending a single soft read command or a set of multiple soft read commands, in certain embodiments, may save time and/or bandwidth on the bus 125 when compared to sending separate standard read commands. For example, a single soft read command may result in three or more sub-read operations, which would otherwise be separately requested and receive separate responses. In further embodiments, a soft read command may specify or include the soft read thresholds, the soft read threshold spacing, and/or other parameters for the multiple sub-read operations used to obtain soft read information. In some embodiments, a soft read command may indicate an amount of soft read information to be gathered. A soft read command may be issued by the read module 304 to one or more of a non-volatile memory controller 124, a non-volatile memory media controller 126, a device driver such as an SML 130, a processor 111, and/or other modules or devices supporting a soft read command for the non-volatile memory device 120.

Soft read commands, in certain embodiments, allow more efficient determination of how a stored read voltage level for a storage cell has drifted or changed over time, facilitating determination of an accurate read voltage threshold for the storage cell, model for a storage region, or the like. In other embodiments, where a soft read command is not available or is not used, the read module 304 may iteratively adjust a read voltage threshold and issue a standard (e.g., hard) read command for each iteration to determine a stored read voltage level for the storage cell, to determine an accurate read voltage threshold for the storage cell, or the like.

Soft read information, as used herein, comprises data indicating an accuracy or quality of a data value determined for a storage cell (e.g., a probability or confidence that the data value is correct), the relative placement of the data in the storage cell (e.g., a microstate, a stored read voltage level, or the like), or otherwise comprises more data than a single bit data value per storage cell. In one embodiment, soft read information may comprise a multi-bit value where each bit indicates whether a corresponding soft read threshold was met. In another embodiment, the soft read information may indicate a likelihood that the cell resides in a particular abode or state. In further embodiments, soft read information may include an indication of a microstate in which the cell resides.

In certain embodiments, the read module 304 may perform more read operations in an estimated direction of voltage drift. For example, the read module 304 may perform one read operation using a read voltage threshold on one side of a previous read voltage threshold and perform multiple read operations using read voltage thresholds on the other side of the previous read voltage threshold, the other side of the previous read voltage threshold being in an estimated direction of voltage drift.

In various embodiments, the read module 304 may read data sets either directly or indirectly from the non-volatile memory media 122. For example, in one embodiment, the read module 304 may receive data sets from another module or element in the read data pipeline 241, the non-volatile memory media 122, or the like. In one embodiment, the read module 304 reads data sets in response to a testing operation, a calibration operation, or the like and the data set may be a sample data set read as part of the testing or calibration operation. The read module 304, in one embodiment, performs a predetermined number of read operations for each identified data set (e.g., page, word line), such as three read operations, four read operations, five read operations, or the like. In a further embodiment, the read module 304 repeats a read operation for an identified data set (e.g., page, word line) with different read voltage thresholds until one or more errors in the data set are correctable.

In one embodiment, the model module 306 is configured to determine the different models (e.g., behavior models, configuration parameter models, read voltage threshold models) for different groups or sets of storage regions (e.g., erase blocks) based on data read by the read module 304. The configuration parameter module 308 may determine one or more configuration parameters, configuration parameter adjustments, or the like based on data read by the read module 304 and the model module 306 may determine a model based on the determined configuration parameters, configuration parameter adjustments, or the like.

For example, the read module 304 may repeat read operations for at least two word lines of an erase block, using different read voltage thresholds or other configuration parameters, until the configuration parameter module 308 may determine an optimal and/or correct setting, value, and/or adjustment for each of the at least two word lines. The model module 306 may use the determined settings, values, and/or adjustments to determine a model for configuration parameters for the entire erase block or other storage region and/or for an entire group or set of erase blocks or other storage regions.

In one embodiment, the model module 306 may use at least two data points (e.g., values and/or adjustments for a configuration parameter) for at least two sampled word lines to determine a model. For example, the model module 306 may determine a model by interpolating other data points (e.g., values and/or adjustments for a configuration parameter) for other word lines from one or more sampled erase blocks or other storage regions, from different groups or sets of erase blocks or other storage regions, based on sampled data.

The model module 306 may use two or more sampled data points, in certain embodiments, to determine a linear model for a configuration parameter. The model module 306 may fit a model to sampled data points. For a linear model, for example, the model module 306 may determine a function or equation for the model, comprising a slope and an intercept of the line connecting or approximating the at least two data points. The model module 306, in other embodiments, may determine or fit one or more curves (e.g., higher level polynomials) to sampled data points.

The model module 306 may store a model as an equation, function, or the like, as one or more coefficients and/or constants (e.g., a slope and an intercept for a linear model), or the like. The model module 306, in certain embodiments, determines and stores models for each different group or set of storage regions (e.g., erase blocks) of a storage element 123, for each storage element 123, or the like, allowing the configuration parameter module 308 to determine configuration parameter adjustments or settings based on the models, without sampling data and storing separate configuration parameter values for each erase block, for each word line, or the like. For example, in embodiments where the association module 302 associates, groups, or classifies erase blocks or other storage regions by retention time (e.g., an amount of time since data was written to the storage regions of the different groups), the model module 306 may determine different models for each retention time group.

In one example, the read module 304 may read data from two word lines of an erase block, for example word line 9 and word line 75 repeatedly, using different read voltage thresholds or other configuration parameters, and based on the data (e.g., a number of errors, whether errors are correctable, or the like) the configuration parameter module 308 may determine a read voltage threshold adjustment of 8 clicks or units for word line 9 and −2 clicks or units for word line 75. The model module 306 may determine a slope for a linear read voltage threshold model of $(-2-8)/(75-9)=-0.1515$ (e.g., rise over run) with an intercept of 9.3636. A negative slope, in certain embodiments, may indicate that values of the model (e.g., read voltage threshold adjustments) decrease as word line positions for the storage region (e.g., erase block) increase. A negative slope, in a further embodiment, may be caused by the increased occurrences of program disturb experienced by word lines earlier in a program order (e.g., having lower positions or addresses in the storage region).

The model module 306, in one embodiment, may use a determined model for a group of storage regions, such as erase blocks, determined by the association module 302, such as storage regions with a similar retention time or the like. The model module 306 may determine a different model for each group in each storage element 123. For example, if the association module 302 determines twelve groups (e.g., retention time groups) of storage regions such as erase blocks per storage element 123, the model module 306 may determine twelve models per storage element 123, or the like.

In one embodiment, the configuration parameter module 308 is configured to determine read voltage thresholds and/or other configuration parameters for storage cells of the non-volatile memory media 122 (e.g., different read voltage thresholds for different word lines of an erase block or other storage region, for different storage elements 123, or the like). In certain embodiments, the configuration parameter module 308 determines a configuration parameter, an adjustment for a configuration parameter, or the like for word lines or other sets of storage cells from which the read module 304 reads or samples data, so that the model module 306 may determine a model based on the determined configuration parameters. For example, the configuration parameter module 308 may cooperate with the read module 304 to reread or resample data from a word line or other set of storage cells, using different read voltage thresholds or other configuration parameters, and the configuration parameter module 308 may determine a correct or optimal read voltage threshold or other configuration parameter based on the read or sampled data (e.g., by selecting a value, setting, or adjustment for a read voltage threshold or other configuration parameter that produced the fewest errors, that produced correctable errors, that produced no errors, or the like).

In response to the model module 306 determining one or more configuration parameter models (e.g., behavior models, read voltage threshold models, or the like), the configuration parameter module 308, in one embodiment, determines configuration parameter values, settings, and/or adjustments for a word line or other set of storage cells based on a determined model. For example, in response to a read request or other trigger, the configuration parameter module 308 may determine to which group or set a word line storing data of the read request belongs and lookup the word line in a model for the group to determine a value for a read voltage threshold or other configuration parameter to be used to read the data of the read request. In an embodiment where the model comprises a linear model with a slope and an intercept, the configuration parameter module 308 may determine a value, setting, and/or adjustment for a configuration parameter for a word line by multiplying an identifier or address for the word line by the slope and adding the intercept to the result, or the like.

In this manner, in certain embodiments, the configuration parameter module 308 may be configured to determine different read voltage thresholds or other configuration parameters for different word lines, using different models from the model module 306 for different groups of erase blocks, based on data sampled by the read module 304. The configuration parameter module 308 may determine different values for a configuration parameter for other sets of cells of the storage region, which the read module 304 did not sample, based on a behavior model for values of the configuration parameter determined for sets of cells of the storage region which the read module 304 did sample.

For example, if the read module 304 reads or samples data from word lines 9 and 75, the configuration parameter module 308 determines values, settings, and/or adjustments for a configuration parameter for word lines 9 and 75, and the model module 306 determines a model for values of the configuration parameter based on the determined values, settings, and/or adjustments, the configuration parameter module 308 may use the model to determine values, settings, and/or adjustments for the configuration parameter for use with other word lines, between and/or to either side of word lines 9 and 75, based on the model. Similarly, in certain embodiments, the configuration parameter module 308 may use the same model to determine values, settings, and/or adjustments for the configuration parameter for word lines in other erase blocks in a same group or set, as determined by the association module 302 (e.g., with similar retention times, P/E counts, erase dwell times, error rates, or another storage media characteristic). The configuration parameter module 308 may determine configuration parameter settings for many word lines or other sets of storage cells (e.g., an entire die or other storage element 123 of a non-volatile memory medium 122) using models determined based on data from just a subset of fewer word lines or other sets of storage cells.

The configuration parameter module 308, in one embodiment, is configured to use a model for a configuration parameter for a group of erase blocks based on a grouping or classification by the association module 302. In one embodiment, the configuration parameter module 308 may configure different groups to use different read voltage thresholds based on different read voltage threshold models associated with different retention times.

As described above, a "configuration parameter" for a set of storage cells refers to any parameter that is configurable or modifiable by way of an interface. The interface may comprise a publicly known interface or a proprietary interface and may include use of particular command instructions and/or use of particular parameters, register settings, driver settings, controller settings, a particular command instruction sequence, or other differences from regular commands (e.g., general purpose commands) or settings used to interface with or manage the non-volatile memory media 122. Configuration parameters may relate to writing to, or programming, storage cells in blocks, reading from storage cells, erasing storage cells, managing storage cells, device driver or storage controller settings for storage cells, or the like. A configuration parameter may be associated with a device driver for the non-volatile memory device 120, a non-volatile memory controller 124, a driver or SML 130, a non-volatile memory media controller 126, or the like, and may relate to how the device driver and/or controller use, manage, and interact with a set of storage cells of the non-volatile memory media 122.

A configuration parameter, in certain embodiments, may refer to a threshold or a set of thresholds. In certain embodiments, various read thresholds for the data-encoding physical property of a storage cell may divide the range of possible stored values into states or abodes (e.g., the threshold values may be boundaries between discrete values stored by the storage cells). For example, in one embodiment, read voltage thresholds may divide a range of possible stored voltages into discrete states for NAND flash memory cells. In another embodiment, read resistance or resistivity thresholds may divide a range of possible stored resistances or resistivities into discrete states for resistive memory cells such as PCM.

In a further embodiment, write thresholds such as program verify thresholds or erase verify thresholds may establish guard bands near the boundaries between states or abodes (e.g., read thresholds), and the write process for a storage cell may include verifying that a cell does not store a value in the guard band between a read threshold and a write threshold. In various embodiments, configuring or reconfiguring read thresholds or other configuration parameters may avoid errors that might otherwise occur as the stored value for a memory cell drifts over time. Similarly, in further embodiments, configuring or reconfiguring write thresholds may allow guard bands to shift with the read thresholds, or may change the size of guard bands (e.g., if larger guard bands become more useful as the non-volatile memory medium 122 ages, or the like)

In a further embodiment, a configuration parameter may refer to a another configurable or modifiable parameter, such as a threshold or parameter pertaining to a driver, a threshold or parameter pertaining to a hardware controller, an incremental step pulse programming parameter, or the like. A configuration parameter may be set once during initialization of the non-volatile memory media 122, dynamically with each command issued to the non-volatile memory media 122, and/or during operation of the non-volatile memory media 122 in response to triggers such as events or periodic time intervals.

In one embodiment, the configuration parameter module 308 may determine configuration parameters for word lines of a group of erase blocks or other storage regions based on the grouping by referencing the configuration parameter model for the group using an address or identifier for a word line, or the like. For example, in one embodiment, the non-volatile memory medium 122 may include registers that store read thresholds (e.g., read voltage thresholds), and the configuration parameter module 308 may set or store one or more configuration parameters for a word line, for an erase block, or the like in the corresponding registers to satisfy a read request or the like. The model module 306 may store a table or other data structure of models, which the configuration parameter module 308 may reference or access by storage element 123, by group, by erase block, by word line, or the like to determine a configuration parameter such as a read voltage threshold in response to a read request, or the like. A model may indicate a read voltage threshold, an offset or adjustment from a default read voltage threshold, another configuration parameter, or the like such that the configuration parameter module 308 may determine a value, setting, and/or adjustment for a configuration parameter using a model.

Figure 4:
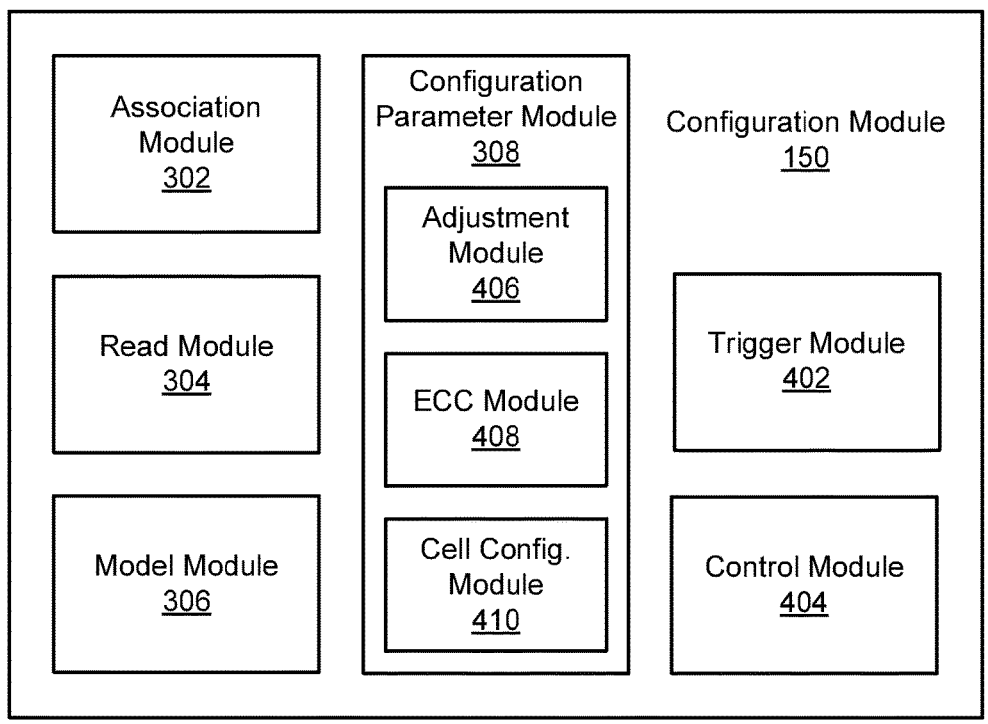
FIG. 4 is a schematic block diagram illustrating a further embodiment of a configuration module.

FIG. 4 depicts a further embodiment of a configuration module 150. The configuration module 150 may be substantially similar to the configuration module 150 described above with regard to FIGS. 1, 2, and/or 3. In the depicted embodiment, the configuration module 150 includes the association module 302, the read module 304, the model module 306, and the configuration parameter module 308 and further includes a trigger module 402 and a control module 404. The configuration parameter module 308, in the depicted embodiment, includes an adjustment module 406, an ECC module 408, and a cell configuration module 410.

In one embodiment, the trigger module 402 is configured to determine that a trigger event has occurred for one or more of the association module 302, the read module 304, the model module 306, and the configuration parameter module 308. In certain embodiments, the association module 302 is configured to regroup and/or reclassify erase blocks or other storage regions in response to the trigger module 402 determining that a trigger event has occurred, based on updated retention times (e.g., amounts of time since data has been written to the erase blocks) or another updated storage media characteristic. The read module 304, in a further embodiment, is configured to resample and/or reread data from one or more erase blocks or other storage regions from each group in response to the trigger module 402 determining that a trigger event has occurred, in response to the association module 302 updating groupings, or the like. The model module 306, in one embodiment, is configured to determine updated models (e.g., behavior models, read voltage threshold models) based on resampled and/or reread data in response to the trigger module 402 determining that a trigger event has occurred, in response to the read module 304 resampling or rereading data, or the like.

In one embodiment, the trigger module 402 monitors or determines the occurrence of the same trigger event or events for the association module 302, the read module 304, the model module 306, and/or the configuration parameter module 308. In a further embodiment, the trigger module 402 monitors or determines the occurrence of different trigger events for the association module 302, the read module 304, the model module 306, and/or the configuration parameter module 308. A trigger event monitored and/or determined by the trigger module 402, in various embodiments, may include the non-volatile memory device 120, the non-volatile memory media 122, a non-volatile memory element 123, one or more storage regions, or the like satisfying an age threshold (e.g., a program/erase cycle count threshold, a time threshold, a retention time threshold), an error rate threshold, a voltage drift threshold, or the like.

For example, in one embodiment, the trigger module 402 may determine that a P/E cycle count for one or more non-volatile memory elements 123, for the non-volatile memory device 120, or the like has been satisfied (e.g., periodically, every 50 P/E cycles, every 100 P/E cycles, or the like) and the association module 302 may update groupings of erase blocks, the read module may read or sample data from at least two word lines of one or more selected erase blocks from each group, the configuration parameter module 308 may determine configuration parameter values for the at least two word lines based on the read or sampled data, and/or the model module 306 may determine an updated model based on the determined configuration parameter values, each in response to the P/E cycle count being satisfied or another trigger event. In certain embodiments, the trigger event monitored and/or determined by the trigger module 402 is associated with a storage media characteristic controlled and/or managed by the control module 404 described below, such as a P/E cycle count, which the control module 404 may maintain within a predefined range or variance, so that it remains substantially similar (e.g., within the predefined range or variance) for the non-volatile memory medium 122.

In one embodiment, the trigger module 402 may determine that a trigger has occurred when a threshold has been satisfied, and the term "trigger" may refer to the threshold, to the threshold being satisfied, or the like. In another embodiment, the term "trigger" may refer to an event other than a threshold being satisfied, that triggers one or more of the association module 302, the read module 304, the model module 306, and/or the configuration parameter module 308. In various embodiments, a threshold may be satisfied by the non-volatile memory device 120, the non-volatile memory medium 122, a non-volatile memory element 123, a storage region of the non-volatile memory medium 122 such as an erase block, a word line, a page, or another group or set of cells, or the like. For example, in one embodiment, an idle time threshold may be satisfied if the non-volatile memory device 120 is idle for a particular amount of time, suggesting that a configuration parameter model may be determined without delaying a storage request. In another embodiment, however, an error threshold for an erase block may be satisfied if an error rate for that erase block is higher than a threshold value, suggesting that the configuration module 150 may reduce the error rate for that erase block by updating configuration parameter models.

In various embodiments, a threshold may be satisfied based on a threshold value, so that the threshold is satisfied if a measured value exceeds, equals, or is less than the threshold value, depending on the threshold. For example, in one embodiment, an error threshold may be based on a percentage or ratio of bits in error, so that the threshold is satisfied if the percentage or ratio of bits in error is above the threshold value. In another embodiment, however, an error threshold may be based on a percentage or rate of bits not in error, so that the threshold is satisfied if the percentage or ratio of bits not in error is below the threshold value. In one embodiment, a threshold value may be expressed directly, in absolute terms. For example, an idle time threshold may be satisfied by an idle time greater than one hour. In another embodiment, a threshold value may be expressed as a ratio, a percentage, or the like. For example, in a further embodiment, a program/erase cycle count threshold may be satisfied by a program/erase cycle count increasing by 1% of an expected maximum lifetime program/erase cycle count since the last update.

In various embodiments, the trigger module 402 may determine that a trigger event has occurred based on various types of thresholds, such as an idle time threshold, a program/erase cycle count threshold, an error threshold, a retention time threshold, or the like. For example, in one embodiment, the trigger module 402 may determine that a trigger event has occurred based on an idle time satisfying an idle time threshold, a program/erase cycle count satisfying a program/erase cycle count threshold, a retention time satisfying a retention time threshold, an error statistic (e.g., a raw bit error rate, uncorrectable bit error rate, ratio of errors that change zeros to ones and errors that change ones to zeros, or the like) satisfying a corresponding error threshold, or the like.

In certain embodiments, the trigger module 402 may use a trigger or threshold based on a characteristic that affects the error rate, voltage drift, or that otherwise suggests a reason for updating a configuration parameter model. For example, in one embodiment, the trigger module 402 may trigger the model module 306 to update read voltage threshold models for NAND flash memory media 122 based on a retention time (e.g., the time since data was last written to a group or set of cells), because charge leakage is likely to increase with higher retention times, so updated read voltage threshold models may avoid or reduce errors. Similarly, in another embodiment, the trigger module 402 may trigger the model module 306 to update read voltage threshold models for NAND flash memory media 122 based on a program/erase cycle count (e.g., the number of times a group or set of cells has been programmed and/or erased), because higher program/erase cycle counts are associated with increased rates of charge leakage due to wear, so updated read voltage thresholds may avoid or reduce errors.

The control module 404, in one embodiment, is configured to manage differences in one or more storage media characteristics for erase blocks or other storage regions of the non-volatile memory medium 122. For example, the control module 404 may perform wear leveling for storage regions (e.g., erase blocks) of the non-volatile storage device so that P/E cycle counts for the storage regions are within a predefined range or variance.

In certain embodiments, the control module 404 may manage differences in storage media characteristics within one or more established limits or predefined ranges. For example, in one embodiment, the control module 404 may control variation of one or more factors affecting an error rate and/or voltage drift for erase blocks or other storage regions of the non-volatile memory medium 122, by managing how and/or when the erase blocks are programmed, erased, or the like. In a further embodiment, the control module 404 may manage or maintain one or more factors affecting an error rate and/or voltage drift for erase blocks or other storage regions of the non-volatile memory medium 122, so that variation of the one or more maintained factors is within a predetermined range. In certain embodiments, the control module 404 may manage variation of a program/erase cycle count for erase blocks or other storage regions of the non-volatile memory medium 122. In certain embodiments, the control module 404 may manage variation of storage media characteristics during operation of the non-volatile memory device 120.

In one embodiment, the one or more controlled or maintained factors or managed storage media characteristics (e.g., factors or storage media characteristics for which the control module 404 controls variation or manages differences) may include a program/erase cycle count for the blocks of the non-volatile memory medium 122. As used herein, a "program/erase cycle count" refers to an indicator of how many program/erase cycles a block has gone through. In certain embodiments, or in certain types of non-volatile media, blocks with higher program/erase counts may be more prone to wear-related errors. In various embodiments, the program/erase cycle count may be incremented at various points in the program/erase cycle. For example, in one embodiment, the program/erase cycle count for a block may be incremented when the block is erased, so that the program/erase cycle count is substantially similar to an erase count. In another embodiment, the program/erase cycle count for a block may be incremented when the first page in the block is programmed, when the block is full, or at another time in the program/erase cycle.

In one embodiment, the one or more controlled or maintained factors or managed storage media characteristics may include an erase dwell time for the blocks of the non-volatile memory medium 122. As used herein, an "erase dwell time" for a block refers to an elapsed time between erasing the block and writing data to the erased block. In certain embodiments, or in certain types of non-volatile media, blocks with higher erase dwell times may be more prone to certain types of errors. In one embodiment, an established limit for managing differences in storage media characteristics may be an erase dwell time threshold, and the control module 404 may manage differences by limiting an erase dwell time to satisfy the threshold.

For example, in one embodiment, the threshold may be a maximum erase dwell time (e.g., five seconds), and the control module 404 may limit erase dwell times below the threshold, thus also limiting variation in erase dwell times. In various embodiments, the control module 404 may limit erase dwell time to satisfy a threshold in various ways. For example, in one embodiment, the threshold may be satisfied for a block if the erase dwell time for the block is below the threshold. In another embodiment, the control module 404 may permit minor variations above the threshold for individual blocks, and the erase dwell time threshold may be satisfied if an average erase dwell time is below the threshold. In view of this disclosure, many types of erase dwell time thresholds are clear.

In one embodiment, the control module 404 may control or manage variation of one or more factors affecting an error rate and/or voltage drift by managing differences in one or more storage media characteristics within one or more established limits. In various embodiments, a limit for managing per-block differences for a storage media characteristic may be established or predetermined in terms of a maximum, a minimum, a target, a range, or the like, and may refer to the storage media characteristic itself, a measurement of the storage media characteristic's variation over multiple blocks, or the like. The control module 404 may maintain factors that affect an error rate by limiting variation of the maintained factors within a predetermined range. For example, in one embodiment, an established limit for managing differences in a program/erase cycle count may be that the program/erase cycle count for individual blocks should not vary by more than two percent of a lifetime expected maximum program/erase cycle count.

In another embodiment, an established limit for managing differences in an erase dwell time (e.g., the time between erasing and programming a block) may be that the erase dwell time should not exceed five seconds for any block. Established limits, or a range for limiting variation of a factor or storage media characteristic, may be predetermined by a non-volatile memory manufacturer, a device manufacturer, a vendor, a user configuring a device (e.g., an administrator, a technician), or the like. In various embodiments, a predetermined range may be directly established as a range (e.g., in terms of endpoints of the range), or indirectly established (e.g., in terms of a target, a percentage of allowable variation, or the like).

In one embodiment, the control module 404 controls or manages variation of a storage media characteristic by controlling a process that affects the storage media characteristic. For example, in one embodiment, the control module 404 may manage variation of a program/erase cycle count by controlling the programming, erasing, and/or grooming processes so that blocks with low program/erase cycle counts receive additional use before blocks with high program/erase cycle counts. In another embodiment, the control module 404 may manage differences in erase dwell times by controlling erasing or grooming processes, so that blocks are erased shortly before additional data is written. By managing or controlling variation in one or more storage media characteristics, in certain embodiments, the control module 404 limits or reduces the number of storage media characteristics which the association module 302 uses to classify or group erase blocks, thereby reducing the number of models determined and stored by the model module 306, reducing the processing and storage overhead of managing configuration parameters.

In one embodiment, the adjustment module 406 and the ECC module 408 are configured in a feedback loop with the read module 304 to determine optimal and/or correct configuration parameter values. For example, the adjustment module 406 may determine and/or set a value for a configuration parameter, such as a read voltage threshold, the read module 304 may read data using the read voltage threshold, and the ECC module 408 may decode the data to provide feedback to the adjustment module 406 based on the read data (e.g., an error rate, a number of errors, a position of errors, whether errors are correctable, or the like). Based on the feedback from the ECC module 408 and/or the read module 304, the adjustment module 406 may either determine that the value or setting for the configuration parameter is correct or satisfactory or may adjust or readjust the value or setting based on the feedback and repeat the process until an optimal and/or correct configuration parameter setting is found. For example, the adjustment module 406 may continue to adjust a read voltage threshold or other configuration parameter until errors in the data are correctable by the ECC module 408, until a read retry threshold is satisfied, for a predefined number of reads, or the like. The adjustment module 406 may communicate a determined read voltage threshold or other configuration parameter (e.g., as an absolute value, as a distance from or adjustment to a default value, or the like) to the model module 306, for use in determining a model.

In one embodiment, the ECC module 408 comprises an ECC decoder (e.g., a hardware ECC decoder of the non-volatile memory media controller 126, a software ECC decoder of a device driver such as the SML 130, or both). The ECC module 408 and/or the adjustment module 406 may operate on data and/or process data in the read pipeline 241, as described above with regard to FIG. 2.

In one embodiment, the adjustment module 406 adjusts the read voltage threshold by a set or predetermined amount (e.g., starts at one adjustment level higher than a default value, increments the read voltage threshold one adjustment level lower for each read, or the like). In a further embodiment, the adjustment module 406 may select an amount to adjust the read voltage threshold based on one or more factors such as age, amount of wear, usage history, error history, or other aspects of the non-volatile memory media 122.

In another embodiment, the adjustment module 406 uses a search algorithm to determine the read voltage threshold. The adjustment module 406, in one embodiment, may use a linear search, a binary search, or the like to determine the read voltage threshold. To check each step as part of the search algorithm, the read module 304 may reread the data set in response to each adjustment, and the ECC module 408 may reprocess the reread data to correct errors, determine an error rate, or the like. The adjustment module 406 may iteratively readjust the read voltage threshold until the ECC module 408 determines that the data is correctable, until a read retry threshold is satisfied, until each of the read voltage threshold level has been tested, or the like.

In one embodiment, the adjustment module 406 stops readjusting a read voltage threshold once a retry threshold is satisfied. For example, if the ECC module 408 cannot correct a data error when a retry threshold for the data set is satisfied, the adjustment module 406 may cease making adjustments to the read voltage threshold. The retry threshold may be selected based on a set of possible read voltage threshold levels, or the like. In one embodiment, a read retry threshold sets a number of times which the adjustment module 406 may adjust a read voltage threshold. The non-volatile memory controller 124, 126, in certain embodiments, may take further remedial action in response to the retry threshold being satisfied, such as retiring the storage cells associated with the data set, logically replacing the storage cells associated with the data set, or the like.

The adjustment module 406, in one embodiment, adjusts the read voltage threshold using a procedure or command provided by a manufacturer of the non-volatile memory media 122. For example, in one embodiment, the adjustment module 406 may adjust the read voltage threshold by writing a value to a settings register of the non-volatile memory media 122, sending a read voltage threshold parameter to the non-volatile memory media 122, or otherwise communicating an adjustment to a read voltage threshold to the non-volatile memory media 122, in cooperation with the cell configuration module 410 or the like. The adjustment module 406 may communicate the adjustment as an absolute value of a read voltage threshold, an amount to adjust the read voltage threshold, an adjustment instruction or command, or the like. In a further embodiment, the non-volatile memory media 122 provides a plurality of discrete levels (e.g., between 2 and 15 different levels) to which the read voltage threshold may be adjusted. In other embodiments, the magnitude of a read voltage threshold adjustment may be defined or recommended by a manufacturer or vendor of the non-volatile memory media 122.

The adjustment module 406, in one embodiment, adjusts the read voltage threshold individually for a word line, page, die, chip, physical erase block (PEB), or other discrete segment or storage region of the non-volatile memory media 122. The adjustment module 406, in a further embodiment, adjusts multiple read voltage thresholds for each storage cell (e.g., each storage cell of a word line or the like). For example, in one embodiment, the storage cells of the non-volatile memory media 122 are MLC storage cells, with multiple read voltage thresholds per cell (e.g., a MLC storage cell may have three distinct read voltage thresholds), TLC storage cells with seven distinct read voltage thresholds, or the like. The adjustment module 406 may move each of the multiple read voltage thresholds together in parallel or it may move them independently.

In embodiments where the storage cells have multiple read voltage thresholds, each read voltage threshold is separated by a separation distance. In one embodiment, the separation distances are uniform between each read voltage threshold. In a further embodiment, the adjustment module 406 adjusts the multiple read voltage thresholds with a single command or procedure and the separation distances between the multiple read voltage thresholds scale with the adjustment. For example, in one embodiment, the separation distances between read voltage thresholds may increase with larger read voltage thresholds and decrease with lower read voltage thresholds. Scaling the separation distances between read voltage thresholds upon adjustment, in one embodiment, provides a more even distribution of read voltage thresholds, so that the ranges of voltages at the ends of the ranges are not reduced or enlarged while middle ranges remain the same.

In one embodiment, the cell configuration module 410 stores a state of the read voltage threshold. The cell configuration module 410, in one embodiment, is part of the non-volatile memory controller 124, 126. The cell configuration module 410, in another embodiment, may send the read voltage threshold to the non-volatile memory media 122 with each read operation. In a further embodiment, the cell configuration module 410 is part of the non-volatile memory media 122, causing the non-volatile memory media 122 to retain adjustments to the read voltage thresholds that the adjustment module 406 makes. The cell configuration module 410, in one embodiment, stores multiple read voltage thresholds (e.g., based on read voltage threshold models), each read voltage threshold or read voltage threshold model for a different segment or grouping of storage cells of the non-volatile memory media 122.

In one embodiment, a manufacturer of the non-volatile memory media 122 provides a command or procedure to adjust a read voltage threshold for a predefined grouping of storage cells, such as a word line, die, die plane, chip, physical erase block, physical page, or the like. In a further embodiment, the cell configuration module 410 stores read voltage threshold models for groups of erase blocks for each non-volatile memory element 123 for which the adjustment module 406 can make adjustments using the manufacturer provided command or procedure. The adjustment module 406 may then, in another embodiment, readjust the read voltage threshold when a data set is read from a sub-grouping based on the read voltage threshold models that the cell configuration module 410 stores.

For example, in response to a read request for a data set from a first word line or other sub-grouping of storage cells, the adjustment module 406 may adjust the read voltage threshold of the entire grouping of storage cells (e.g., erase block) to a level that the cell configuration module 410 stores for the first sub-grouping (e.g., as part of a read voltage threshold model or the like). In response to a read request for a data set from a second word line or other sub-grouping, in one embodiment, the adjustment module 406 may readjust the read voltage threshold for the entire grouping (e.g., erase block) to a level that the cell configuration module 410 stores for the second sub-grouping (e.g., as part of a read voltage threshold model or the like). This allows the configuration module 150 to adjust the read voltage thresholds for the non-volatile memory media 122 at a finer scope than may be provided for in commands or procedures available for the non-volatile memory media 122. For example, a manufacturer may provide a command, procedure, or methodology for adjusting a read voltage threshold for an erase block, die, die plane, chip, or other grouping of storage cells and the adjustment module 406 may adjust read voltage thresholds for individual word lines, pages, or other sub-groupings in accordance with that command procedure or methodology.

Figure 5A:
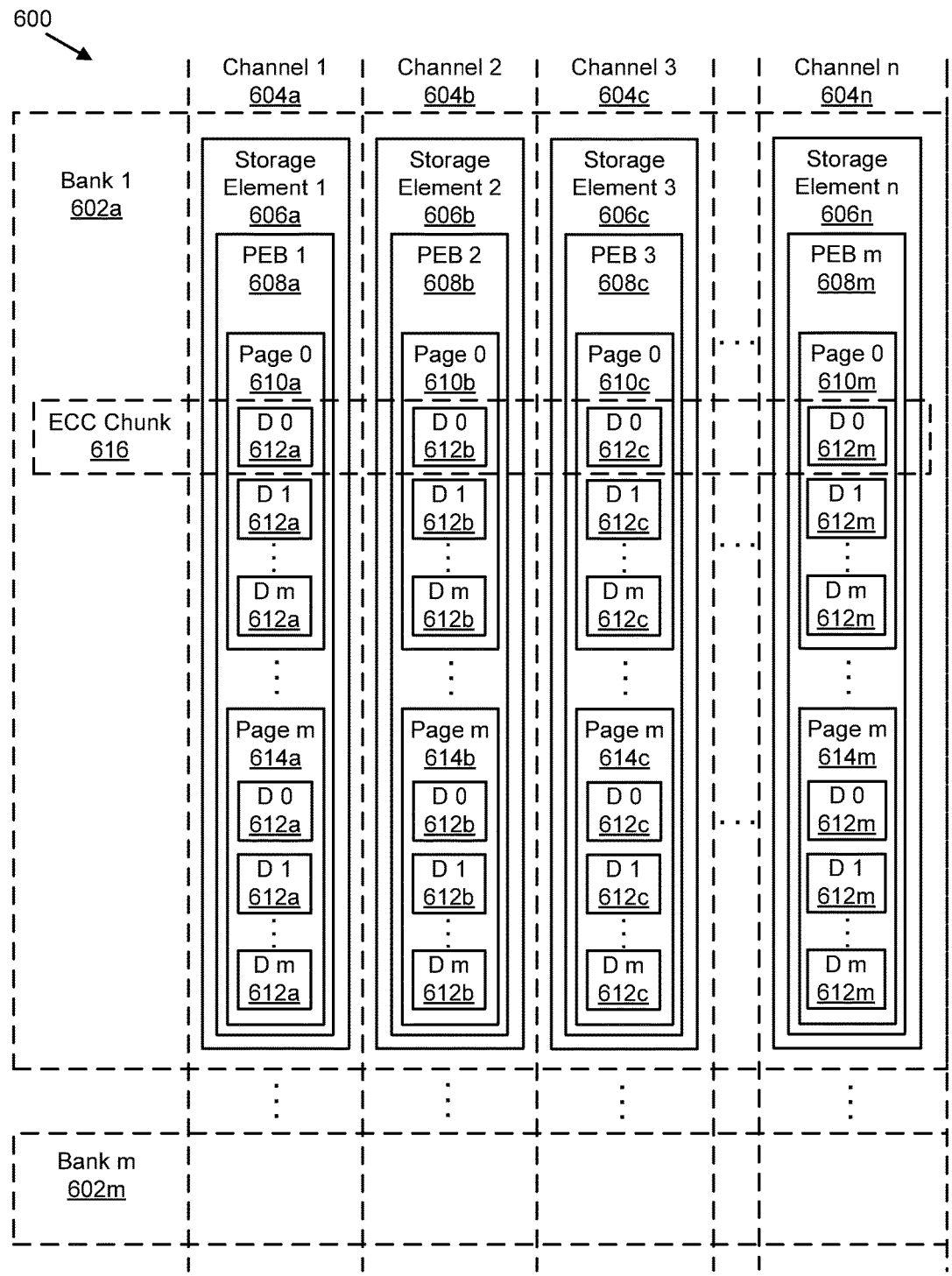
FIG. 5A is a schematic block diagram illustrating one embodiment of an array of storage elements of non-volatile memory media.
Figure 5B:
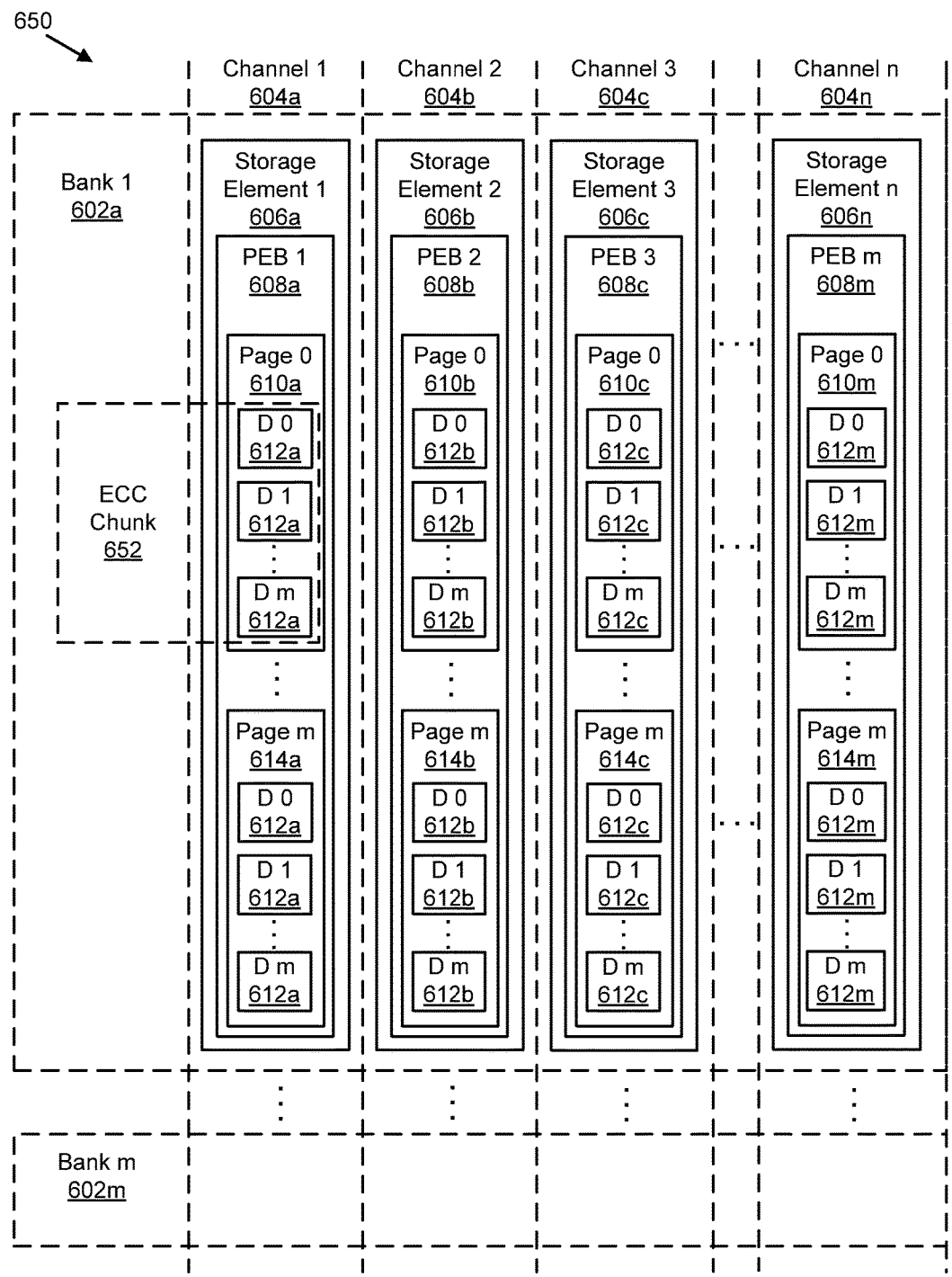
FIG. 5B is a schematic block diagram illustrating another embodiment of an array of storage elements of non-volatile memory media.

As described in greater detail with regard to FIGS. 5A and 5B, in one embodiment, a data set may be stored across several die, die planes, chips, channels, storage elements, PEBs, or other grouping of storage cells. ECC checkbits, in one embodiment, may be calculated and stored independently for each grouping of storage cells. In another embodiment, the ECC checkbits, stored together with each grouping of storage cells, for example as part of an ECC code word.

In a further embodiment, the ECC module 408 uses ECC checkbits to determine in which die, die plane, chip, channel, storage element, PEB, or other grouping of storage cells of the non-volatile memory media 122 an uncorrectable error has occurred. The ECC module 408, in one embodiment, verifies data sets of each grouping of storage cells using ECC checkbits to determine which particular grouping from a set of groupings of storage cells have uncorrectable errors. The configuration module 150, in one embodiment, adjusts one or more read voltage thresholds in the particular groupings of storage cells with an uncorrectable error, re-determines or updates a read voltage threshold model for the particular groupings of storage cells, or the like.

In one embodiment, the cell configuration module 410 uses values for a configuration parameter based on a model for a group of erase blocks or other storage regions. For example, based on a position of a word line within an erase block, the cell configuration module 410 may lookup or otherwise determine one or more read voltage thresholds for the word line and may configure the word line to use the one or more read voltage thresholds to satisfy a read request for data of the word line.

In one embodiment, the cell configuration module 410 configures a word line or other set of storage cells to use a configuration parameter from a configuration parameter model that the model module 306 determines for a group of erase blocks comprising the set of storage cells. As described above, a set of storage cells may include groups or sets of pages, physical erase blocks, logical erase blocks, word lines, ECC chunks/code words, chips, die, die planes, or other storage regions including one or more storage cells. The cell configuration module 410 may configure different sets of storage cells, different word lines, different sets of pages, different storage states or abodes of storage cells, or the like to use different configuration parameters, based on one or more models determined by the model module 306. The cell configuration module 410, in one embodiment, configures storage cells to use a configuration parameter such that the configuration parameter is used for subsequent accesses to and/or operations on the storage cells.

The cell configuration module 410 uses an interface of a set of storage cells to configure the set of storage cells. The interface may comprise a publicly known interface or a proprietary interface. The cell configuration module 410 may configure a set of storage cells by setting a data register, by sending a command over a command interface of a control bus for the non-volatile memory media 122, by calling an API of a device driver of the non-volatile memory device 120, by setting a control parameter for the non-volatile memory controller 124, 126, or otherwise configuring the set of storage cells. The cell configuration module 410 may use particular command instructions, a particular sequence of command instructions, and/or use particular parameters, register settings, or other differences from regular commands (general purpose commands) used to interface with the set of storage cells. The cell configuration module 410 may receive a configuration parameter model from the model module 306, may retrieve a configuration parameter model from a configuration parameter model repository or other data structure, or the like.

The cell configuration module 410, in one embodiment, configures a set of storage cells to use a determined configuration parameter (e.g., from a configuration parameter model) in response to a trigger. The trigger, in certain embodiments, is selected based on an architecture of the non-volatile memory device 120 and/or of the non-volatile memory media 122. For example, certain non-volatile memory devices 120 and/or non-volatile memory media 122 may retain a configuration parameter across multiple input/output operations, while another non-volatile memory device 120 and/or non-volatile memory media 122 may require a configuration parameter to be set with each input/output operation, or the like. The cell configuration module 410 may configure a set of storage cells once during initialization of the non-volatile memory media 122, dynamically with each command issued to the set of storage cells, during operation of the non-volatile memory media 122 in response to events or time intervals, in response to the model module 306 determining an updated model, in response to another trigger, or the like.

In one embodiment, a trigger for the cell configuration module 410 includes a change in a model made by the model module 306, a trigger determined or detected by the trigger module 402, or the like. In another embodiment, a trigger for the cell configuration module 410 includes an input/output request for a set of storage cells, such as a read request, a write request, an erase request, or the like. For example, in certain embodiments, the cell configuration module 410 may configure a set of storage cells to use a read configuration parameter in response to a read request for the storage cells, may configure a set of storage cells to use a write configuration parameter in response to a write request for the storage cells, may configure a set of storage cells to use an erase configuration parameter in response to an erase request (e.g., as part of a storage capacity recovery operation), or the like.

In a further embodiment, a startup operation for the non-volatile memory device 120, a regular shutdown operation for the non-volatile memory device 120, or the like is a trigger for the cell configuration module 410 to configure one or more sets of storage cells. In certain embodiments, once the cell configuration module 410 configures a set of storage cells with a configuration parameter in response to a startup operation, the set of storage cells retain the configuration parameter until a shutdown operation and a subsequent startup operation, or the like. How a set of storage cells retain configuration parameters may vary depending on the type of configuration parameter, the architecture of the set of storage cells, and the like.

The cell configuration module 410, in a further embodiment, may configure only a subset of one or more abodes/ storage states of a set of storage cells to use a configuration parameter. For example, if a configuration parameter setting for an abode/storage state has little or no change from a previous configuration parameter setting, from a default configuration parameter setting, or the like, the cell configuration module 410 may configure one or more other abodes/ storage states without configuring the abode/storage state with little or no change in the configuration parameter setting. In certain embodiments, configuration settings for different abodes/storage states of a set of storage cells may be set by writing the settings to different registers associated with the different abodes/storage states, and the cell configuration module 410 may write configuration settings, such as read voltage thresholds or the like, only to registers for which the configuration settings have changed, based on one or more models from the model module 306. In other embodiments, the cell configuration module 410 may set configuration settings for each abode/storage state of a set of storage cells in response to each storage request or other trigger event.

The cell configuration module 410 may configure storage cells a storage region at a time, writing configuration parameter settings to registers for a word line, a group or set of pages, a physical erase block, a logical erase block, an ECC chunk/code word, a chip, a die, a plane in a die, or another storage region. In certain embodiments, the cell configuration module 410 may configure storage cells by storing configuration parameter settings in a bank cache or buffer for the non-volatile memory media 122. In a further embodiment, the cell configuration module 410 may configure storage cells using a configuration parameter override table or other override metadata configured, scaled, or otherwise structured according to an architecture of the non-volatile memory media 122.

FIG. 5A depicts one embodiment of an array 600 of storage elements 606 of non-volatile memory media 122. In the depicted embodiment, an ECC chunk 616 includes data 612 from several storage elements 606. In a further embodiment, ECC checkbits for the ECC chunk 616 are also stored across several storage elements 606.

The array 600 of storage elements 606, in one embodiment, includes N number of storage elements 606a, 606b, 606c, . . . 606n. Each storage element 606 may comprise a device, a chip, a portion of a chip, a die, a plane in a die, or the like. In the depicted embodiment, the storage elements 606a-n form a bank 602a. The array 600, in one embodiment, includes several banks 602a . . . 602m. The banks 602a-m, in the depicted embodiment, include several channels 604a, 604b, 604c, . . . , 604n. In one embodiment, a packet or data set is written across the several channels 604a-n and data is read separately from each channel 604a-n and reassembled into the packet. In another embodiment, an ECC chunk 616, packet, or data set is written across the several channels 604a-n and data is read in parallel from all the channels 604a-n. One read operation on a bank 602a may read a whole ECC chunk 616, packet, or data set or a portion of an ECC chunk 616, packet, or data set that is reassembled into a whole ECC chunk 616, packet, or data set. In the depicted embodiment, each channel includes at least one storage element 606 in each bank 602.

Furthermore, in one embodiment, each storage element 606 includes a physical erase block or "PEB" 608. For example, storage element one 606a includes PEB one 608a. A physical erase block is typically an erase block located on one die, die plane, chip, or other storage element 606. Each PEB 608 includes m physical pages 610. For example, PEB one 608a includes page 0 610a . . . page m 614a. Each physical page 610a stores a portion of data ("D 0, D 1, . . . , D m") 612 and ECC checkbits distributed with the data 612.

In one embodiment, a group of PEBs (PEB 1 608a-PEB m 608m) forms a logical erase block ("LEB"). An LEB may span the array of N storage elements 600. In certain embodiments, an LEB is sized to fit within a bank 602a-m, with one PEB 608a-m from each storage element 606a-n or the like. In other embodiments, a LEB may span different banks 602a-m and may include one or more PEBs 608a-m from multiple banks 602a-m. Furthermore, in an embodiment, a logical page ("LP") spans a plurality of physical pages 610 in a row. In another embodiment a logical page spans N storage elements 606a-n.

In one embodiment, the ECC is a block code that is distributed with the data. Furthermore, the data and the ECC may not align with any particular physical hardware boundary. As a result, error correction with the ECC codes is not dependent on a particular hardware configuration. Therefore, the ECC and corresponding data may form an ECC chunk 616 and the ECC chunk 616 may be divided and stored on one or more of the N storage elements 606a-n. An ECC chunk 616 typically spans at least a portion of a plurality of physical pages 610 of a logical page where the data and ECC generated from the data 612a, 612b, . . . 612m are spread across the N storage elements 606a-n. In one embodiment, a LP includes a plurality of ECC chunks 616. A physical page 610 may contain one or more data bytes of the ECC chunk 616. An ECC chunk 616 may span multiple rows within a physical page 610 and a physical page 610 may include a plurality of ECC chunks 616.

Because, in the depicted embodiment, the ECC checkbits for the ECC chunk 616 are distributed across several storage elements 606a-n and channels 604a-n, when a data error occurs due to a read voltage shift in one or more of the storage elements 606a-n, the ECC module 408 may not be able to determine which storage elements 606 have an error that is correctable by adjusting the read voltage threshold. In one embodiment, the model module 306 determines different models for each word line (and associated pages 610, 614) and the cell configuration module 410 adjusts or sets the read voltage thresholds of the storage elements 606 as defined by models from the model module 306.

In one embodiment, the adjustment module 406, the ECC module 408, the trigger module 402, and/or the model module 306 determines that a data set has an error, that a page or word line needs an updated read voltage threshold, that an erase block or group of erase blocks needs an updated model, or the like based on a read data set and the ECC module 408 determines from which storage element 606 the data set was read. For example, in one embodiment, the array 600 may have 24 channels 604, and 8 bytes may be read in parallel from 24 storage elements 606 of a single bank 602 during a read operation for a total of 192 bytes per read operation. Based on this information, the ECC module 408, in one embodiment, can determine from which storage element 606 a data set was read based on the position of an 8 byte data set within the 192 bytes. In one embodiment, the 192 bytes comprise the ECC chunk 616.

FIG. 5B is a schematic block diagram illustrating one embodiment of an array 650 of N storage elements 606. The array 650, in the depicted embodiment, is substantially similar to the array 600 of FIG. 5A, but with the ECC chunk 652 including data 612a in a single storage element 606a, instead of across several storage elements 606a-n. In one embodiment, ECC checkbits for the ECC chunk 652 are stored in the single storage element 606a. Because each storage element 606a-n or channel 604a-n has separate ECC checkbits, in one embodiment, the ECC module 408 uses the separate ECC checkbits to determine in which storage elements 606a-n or channels 604a-n an error has occurred, and the model module 306 may adjust or re-determine one or more read voltage threshold models for the particular storage element(s) 606 determined by the ECC module 408.

Figure 6A:
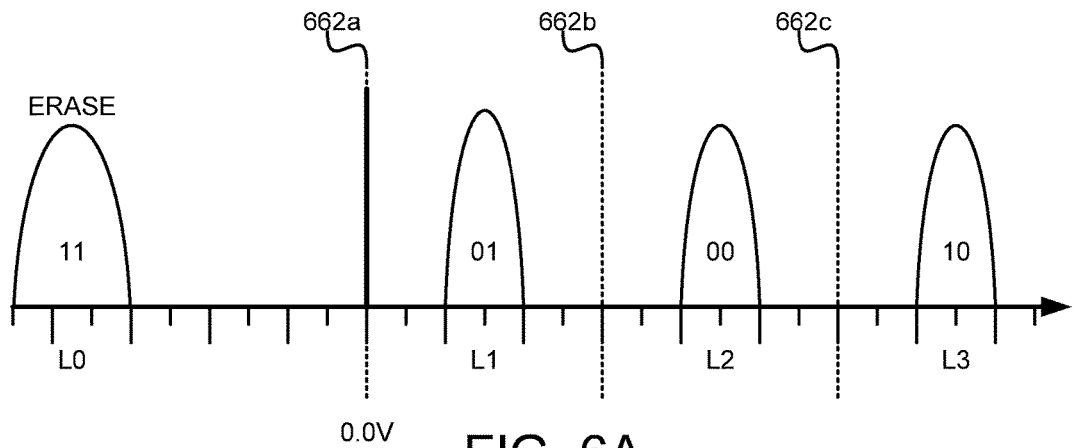
FIG. 6A is a schematic block diagram illustrating one embodiment of configuration parameters for a set of multi-level storage cells of non-volatile memory media.

FIG. 6A shows one embodiment of configuration parameters 662a-c for a set of multi-level storage cells, such as MLC NAND flash storage cells, or the like, with an example encoding or programming model. Any limitations inherent in the represented encoding model do not necessarily apply to all other encoding models, and the present disclosure should not be construed as inherently containing any such limitations. The read voltage states, in the depicted embodiment, are encoded using a Gray code encoding model, with binary values for adjacent states differing by a single bit in the encoding.

FIG. 6A shows that the value "11" is associated with the lowest read voltage state (labeled L0, an "erase" state), the value "01" is associated with the next lowest read voltage state (labeled L1), the value "00" is associated with the next highest read voltage state (labeled L2), and the value "10" is associated with the highest read voltage state (labeled L3). In FIG. 6A, the lowest read voltage state L0 is depicted as a negative voltage. Values, magnitudes, sizes, and the like of read voltages may vary by manufacturer and type of non-volatile memory cell, each of which are encompassed by the present disclosure. The configuration parameters 662, in the depicted embodiment, are read voltage thresholds 662 that separate states L0, L1, L2, and L3, as described above.

The non-volatile memory controller 124, 126 interprets the four discrete levels of voltage stored in the multi-level storage cell as representing two binary bits one represented by a most significant bit (MSB) in the cell encoding and one represented by a least significant bit (LSB) in the cell encoding. As explained above, other programming and encoding models may be used. Also, certain non-volatile memory media 122 may have more than four possible states, as described below with regard to FIG. 6C, allowing more than two binary values to be stored in a single multi-level storage cell, triple-level storage cell, quad-level storage cell, or the like. The voltage level abodes or storage states L0, L1, L2, and L3 may or may not be contiguous; for example, in certain embodiments, the voltage level abodes or storage states are separated by band gaps known as guard band. For example, L0 and L1 may be separated by 0.3V.

In one embodiment, the LSB corresponds to a lower page of data and the MSB corresponds to an upper page of data. In certain embodiments, the multi-level storage cell may adhere to a two-phase programming model, described below, which requires that the LSB be written to before the MSB can be written or vice versa. In another embodiment, the LSB and MSB may be programmed separately by the non-volatile memory controller 124, 126. Such an approach may be taken due to vendor or manufacturer requirements for page pairing (e.g., a LSB bit of MLC cell is paired with an MSB bit of a different MLC cell) and page addressing (e.g., LSB page must be programmed before the MSB page or vice versa). In certain instances, the LSB must be written before the MSB is written, the MSB must be written before the LSB is written, or the like.

In certain embodiments, the non-volatile memory media 122 may employ a two-phase programming model for MLC, a three-page programming model for TLC, or the like. In such a model, a binary value is first written to the LSB by way of a first write command to the lower page. The write command causes the multi-level storage cell to move from its initial state (for example, a 11 state in L0) to an intermediate state (the lower-to-middle LM state—between L1 and L2) configured such that a 00 state is subsequently read. For example, writing a "0" to the lower page causes the multi-level storage cell to change from the L0 state (where both the LSB and the MSB are 1) to the L2 state (where the LSB is changed to a 0). A subsequent write of a "0" to the upper page moves the multi-level storage cell from the intermediate state (typically between the L1 state and the L2 state) to L2 state such that both bits of the MLC are "0". Thus, in such an embodiment, two writes (one to the lower page and one to the upper page) are needed to move the multi-level cell from L0 to L2, since the cell transitions through the intermediate state and the MLC device requires that the lower page be programmed before the upper page and does not allow partial programming of a page without an intervening erase operation. Writing a "1" to either of the upper page or lower page will cause the MLC to transition to either L1 or L3 depending on the binary value of the lower page at the time. In addition, certain non-volatile memory media vendors may impose a requirement that the lower page must be written to before the upper page, or the like. In other embodiments, the non-volatile memory media 122 may employ a two-phase programming model where a binary value is first written to the MSB by way of a first write command to the upper page.

In certain embodiments, the configuration module 150 determines and manages read voltage thresholds 662 or other configuration parameters individually for one or more of the abodes L0, L1, L2, L3, determining different settings or adjustments to configuration parameters in different abodes L0, L1, L2, L3 based on one or more models determined by the model module 306. In one embodiment, the configuration parameter module 308 may determine and/or adjust one or more read voltage thresholds 662 based on a subset of binary data that multi-level storage cells store, such as just an upper page, just a lower page, or the like. In such embodiments, examining the state changes for the LSB bit(s) may indicate the direction the voltage in the multi-level storage cell is changing, providing input upon which the adjustment module 406 may determine an adjustment. For both Gray code encoding (as depicted in FIG. 6A) and binary code encoding of bit values, the LSB of a multi-level storage cell transitions between a binary zero and a binary one between the middle two abodes or states, the L1 state and the L2 state in the depicted embodiment.

For other encoding models, the MSB may transition between a binary zero and a binary one between the middle two abodes or states, or the like. For Gray code or binary code encoding models, the LSB has a value of "1" for read voltages in a lower range (including the lower two states or abodes, L0 and L1) and the LSB has a value of "0" for read voltages in an upper range (including the upper two states or abodes, L2 and L3). By using just the LSB of MLC storage cells to determine whether a stored read voltage has drifted, the adjustment module 406, in one embodiment, may make the determination in a substantially similar manner to SLC storage cells.

For certain types of multi-level storage cells, the middle read voltage threshold 662b and the adjacent L1 and L2 states may be more sensitive to read disturb or other factors that can cause read voltages to drift. Further, as described above, in certain embodiments, the LSB and the MSB of a single multi-level storage cell may represent data stored in different physical pages. Using a single bit from each of a plurality of multi-level storage cell as a data set, in one embodiment, may reduce a number of read operations to retrieve the data set. In other embodiments, use of a single bit from each of a plurality of multi-level storage cells in the lower page simplifies a process of detecting a deviation and direction of voltage drift for multi-level storage cells.

In one embodiment, the ECC module 408 determines a direction of voltage drift for a grouping of multi-level storage cells based on a data set that includes data from one or more lower pages of the multi-level storage cells. Because the lower pages include the LSBs, in certain embodiments, the ECC module 408 determines that a read voltage threshold 662 deviates toward a larger read voltage in response to a data error or bit error indicating that storage cell values for the LSBs have transitioned from a binary one to a binary zero. For an LSB to transition from a binary one to a binary zero, a read voltage for a multi-level storage cell using the encoding model of FIG. 6A must drift from either an L0 or L1 state to an L2 or L3 state, indicating that one or more of the read voltage thresholds 662 should be increased, to place the read voltage back in the original L0 or L1 state.

Similarly, in certain embodiments, the ECC module 408 determines that a read voltage threshold 662 deviates toward a smaller read voltage in response to a data error indicating that storage cell values for the LSBs have transitioned from a binary zero to a binary one. For an LSB to transition from a binary zero to a binary one, a read voltage for a multi-level storage cell using the encoding model of FIG. 6A must drift from either an L3 or L2 state to an L1 or L0 state, indicating that one or more of the read voltage thresholds 662 should be decreased, to place the read voltage back in the original L3 or L2 state. In certain embodiments, a deviation across multiple states may be unlikely, and deviations detectable using LSBs may be between the L1 and L2 states, indicating a clear direction of deviation in either direction.

In another embodiment, the ECC module 408 determines a direction of voltage drift based at least partially on an encoding type used for storage cells of the non-volatile memory media 122, a physical and/or electrical architecture of the storage cells of the non-volatile memory media 122, or the like. For example, based on the encoding model of FIG. 6A, the ECC module 408 may determine a direction of voltage drift based on a 2-bit MLC media type, based on whether the data set includes an upper page or a lower page, based on the depicted Gray code encoding type, based on whether a data value in error has changed from a binary zero to a binary one or vice versa, or the like. In a further embodiment, the ECC module 408 may transform or combine LSBs and MSBs from separate or disparate addresses, such as different physical pages or the like, into a single data set or may otherwise coordinate LSBs and MSBs to determine a direction of deviation.

Using each bit stored in multi-level storage cells to determine a read voltage threshold adjustment, in certain embodiments, can increase the accuracy of the read voltage threshold adjustment, but may increase the number of read operations or add complexity to the determination. In one embodiment, if the ECC decoder detects a data error in an upper page of a grouping of multi-level storage cells, the read module 304 retrieves one or more lower pages for the grouping and the configuration module 150 adjusts a read voltage threshold model for the grouping based on the lower pages, or the like.

Figure 6B:
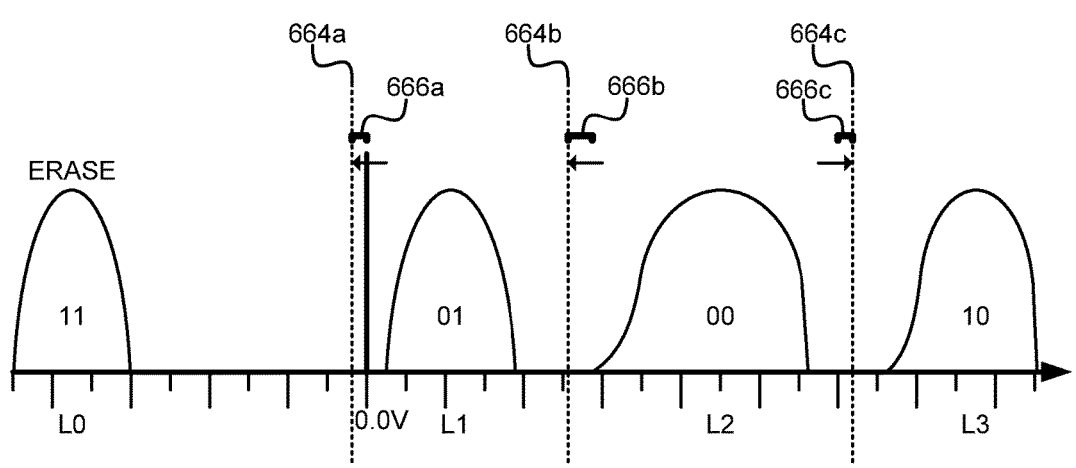
FIG. 6B is a schematic block diagram illustrating one embodiment of adjusted configuration parameters for a set of multi-level storage cells of non-volatile memory media.

FIG. 6B depicts one embodiment of adjusted configuration parameters 664a-c for a set of multi-level storage cells of non-volatile memory media 122. In certain embodiments, the configuration parameters 662a-c of FIG. 6A are default configuration parameters, set by a manufacturer, a vendor, or the like and the configuration module 150 adjust the default configuration parameters 662a-c to the adjusted configuration parameters 664a-c, based on one or more configuration parameter models. The configuration module 150, in one embodiment, determines different adjustments 666a-c to the default configuration parameters 662a-c resulting in the different adjusted configuration parameters 664a-c. In the depicted embodiment, the configuration module 150 determines the different adjustments 666a-c individually for the different abodes L0, L1, L2, L3, with different magnitudes, different directions, and the like, customizing the different adjusted configuration parameters 664a-c individually to media characteristics of the different abodes L0, L1, L2, L3 based on separate read voltage threshold models determined for the different configuration parameters 664a-c. In another embodiment, the configuration module 150 may adjust the configuration parameters 664a-c together in parallel based on a single read voltage threshold model.

The adjusted configuration parameters 664a-c more closely match the actual distributions of storage cell states of FIG. 6B than do the default configuration parameters 662a-c. Were a corresponding set of storage cells to use the default configuration parameters 662a-c with the distributions of storage cell states of FIG. 6B, the portions of the distributions that have drifted past the locations of the default configuration parameters 662a-c would register data errors. Similarly, because the charge levels of the different abodes L1, L1, L2, L3 have drifted, leaked, been disturbed, or the like by different amounts and in different directions, using the same adjustment 664 for each abode L0, L1, L2, L3, in certain embodiments, may register data errors. By configuring the corresponding set of storage cells to use the individually adjusted configuration parameters 664a-c, the configuration module 150 and the configuration module 150 prevent, avoid, or correct the potential data errors by determining the adjusted configuration parameters 664a-c based on one or more models determined by the model module 306, as described above.

Figure 6C:
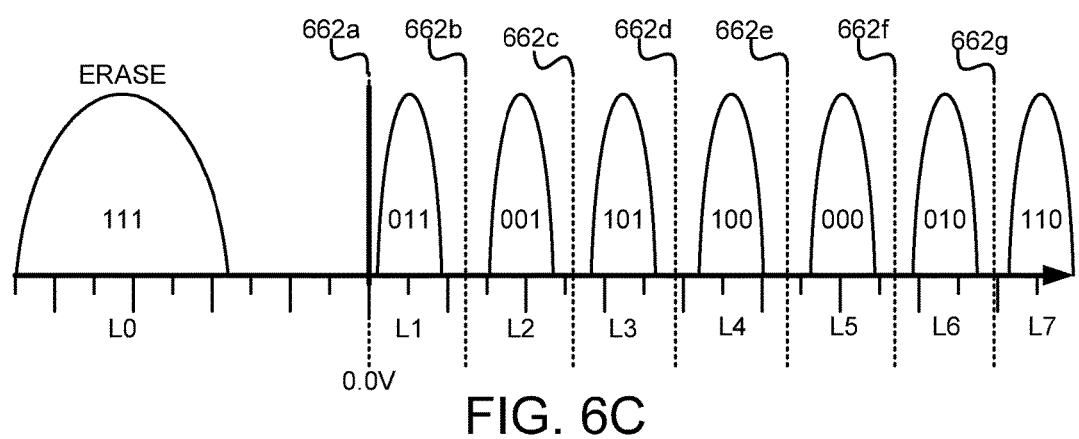
FIG. 6C is a schematic block diagram illustrating one embodiment of configuration parameters for a set of triple-level storage cells of non-volatile memory media.

FIG. 6C is a schematic block diagram illustrating one embodiment of configuration parameters 662a-g for a set of triple-level storage cells of non-volatile memory media 122, such as MLC NAND flash storage cells, or the like, with an example encoding or programming model. Any limitations inherent in the represented encoding model do not necessarily apply to all other encoding models, and the present disclosure should not be construed as inherently containing any such limitations. The read voltage states, in the depicted embodiment, are encoded using a Gray code encoding model, with binary values for adjacent states differing by a single bit in the encoding.

Performing a reliable read on TLC memory media 122, in certain embodiments, may be a more difficult task since a read window between program states L1-L7 may be narrower than in MLC memory media 122, as depicted in FIGS. 6A-6C. As wear-out effects start to change the cell characteristics, the read window may get smaller and more bit errors may be generated during reads as a result.

As described above, the read module 304 may read or sample data at predefined "retention points" (e.g. 1, 2, 4 hours after programming) as determined by the association module 302. The model module 306 may determine a model for the voltage drift and/or for corresponding read voltage threshold adjustments, storing a small table or record of optimized read voltage threshold models per retention point group per die or other storage element 123, using a background task or the like. The model module 306 may update the table or record at certain wear points based on an average P/E cycle count, as determined by the trigger module 402. In this manner, for each retention point, the read voltage thresholds may shift slowly with P/E cycle count, according to the determined models. Hence, a few measurements by the read module 304 (e.g., 5 reads, or the like) may be made for every sampling point to allow the model module 306 to determine an accurate model. Multiple die or other storage elements 123, in certain embodiments, may be examined simultaneously to determine models for the different die or other storage elements 123.

FIG. 7 is a graph 700 illustrating one embodiment of configuration parameter models 700 for a set of word lines 704. In the depicted embodiment, each of the eight sets of plotted data points represents a read voltage threshold adjustment 702 for a different retention time group, as classified by the association module 302, where each data point is for a physical word line location 704, 0-85. In the graph 700, a read voltage threshold adjustment 702 of 0 represents the default read voltage threshold value or setting, with each read voltage threshold adjustment 702 above or below 0 comprising a read voltage adjustment level (e.g., a "click"), as defined for the non-volatile memory media 122.

The model module 306, in the depicted embodiment, has fit a linear model 708, 710 to the read voltage threshold adjustments 702 for each retention time group. The linear models 708, 710 decrease as the physical word line locations 704 increase, having negative slopes. For example, word lines with lower physical locations 704 may be located earlier in a programming order, and may receive a greater number of program disturb events than word lines with higher physical locations 704 that may be located later in the programming order, with each program disturb event increasing the stored read voltage levels (e.g., an upward voltage drift).

In the depicted embodiment, the voltage levels for the different sets of plotted data points decrease or drift downward over time, so that the eight depicted retention groups are ordered from top to bottom by increasing retention times (e.g., 0 hours, 2 hours, 4 hours, 8 hours, 16 hours, 32 hours, 48 hours, 64 hours). The read module 304 may sample data from at least first and second word lines 706 from one or more erase blocks from each retention group and may determine the linear models 708, 710 based on the sampled data. In this manner, the configuration parameter module 308 may determine read voltage threshold adjustments 702 for each of the word lines 704 based on the linear models 708, 710, while only a few of the word lines 706 are actually sampled. Further, the read module 304, in certain embodiments, only samples word lines 706 from a few erase blocks of each group while the determined models 708, 710 are used for each erase block of the group. In the depicted embodiment, for TLC media 122, for example, a single model 708, 710 may be used for each of the seven read voltage thresholds 662a-g per word line 704, with the configuration parameter module 308 making the same adjustment 702 to each of the seven read voltage thresholds 662a-g, or the like. In other embodiments, the model module 306 may determine different models 708, 710 for different read voltage thresholds.

In the depicted embodiment, the linear models 708 are depicted graphically, with a few examples also depicted as equations or functions 710. For example, where the read voltage threshold adjustment 702 is y and the physical word line location 704 is x, for the first linear model 710, y=−0.1084x+12.644. As described below, the model module 306 may determine and/or store a linear model 708, 710 as a slope and an intercept, a slope of −0.1084 and an intercept of 12.644 for the first linear model 710 in the depicted embodiment.

FIG. 8A depicts one embodiment of sets of configuration parameter models 800 for erase blocks of non-volatile memory media 122. In the depicted embodiment, the model module 306 stores a linear model comprising a slope 804 (e.g., $a_0$-$a_N$) and an intercept 806 (e.g., $b_0$-$b_N$) for each group 802 of erase blocks 0-N of a storage element 123a-n, which the association module 302 may group based on retention time or another storage media characteristic. In this manner, the configuration parameter module 308 may simply reference the group 802 for an erase block of a read request, multiply the word line number by the associated slope 804 and add the associated intercept 806 to determine a read voltage threshold setting for the word line.

FIG. 8B depicts one embodiment of configuration parameter models 810 for erase blocks of a non-volatile memory element 123. In the depicted embodiment, the model module 306 stores a linear models 814, 816 for groups 0-N 802. The association module 302 has determined the groups 802 based on retention time 812, with a power of two scale, in hours. For each group 802, the model module 306 determines a different linear model for each read voltage threshold V0 814-VN 816, where the resulting read voltage threshold adjustment, $Y_{N,N}$, is equal to a slope, $a_{N,N}$, multiplied by the word line address X, with the result added to an offset, $b_{N,N}$.

Each storage element 123, in one embodiment, may be associated with a different set 810 of configuration parameter models 810, indexed by group 802 or the like. In certain embodiments, different conditions, workload types, storage media characteristics, or the like may result in different slopes, $a_{N,N}$, different offsets, $b_{N,N}$, or the like. Even with a different read voltage threshold model for each of seven different read voltage thresholds 815, 816, twelve different groups 802, and a byte for each slopes, $a_{N,N}$, and offset, $b_{N,N}$, the storage space for storing the read voltage threshold models 810 per die or other storage element 123, is 12×14 bytes, or 168 bytes per die or other storage element 123, much less than storing separate read voltage thresholds per word line of each erase block without a model.

Figure 9:
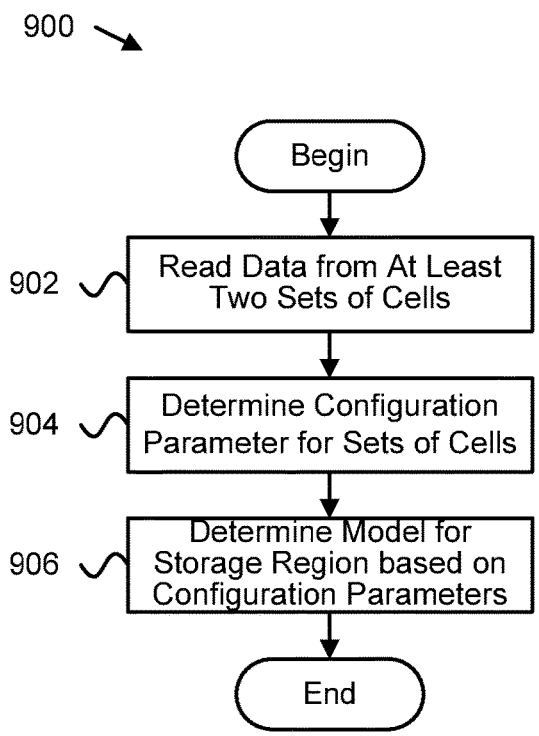
FIG. 9 is a schematic flow chart diagram illustrating one embodiment of a method for model based configuration parameter management.

FIG. 9 depicts one embodiment of a method 900 for model based configuration parameter management. The method 900 begins and the read module 304 reads 902 data from at least sets of storage cells, such as word lines, pages, or the like, of a storage region, such as an erase block. The configuration parameter module 308 determines 904 configuration parameters for the read 902 sets of storage cells. The model module 306 determines 906 a model for the storage region, based on the determined 904 configuration parameters and the method 900 ends.

Figure 10:
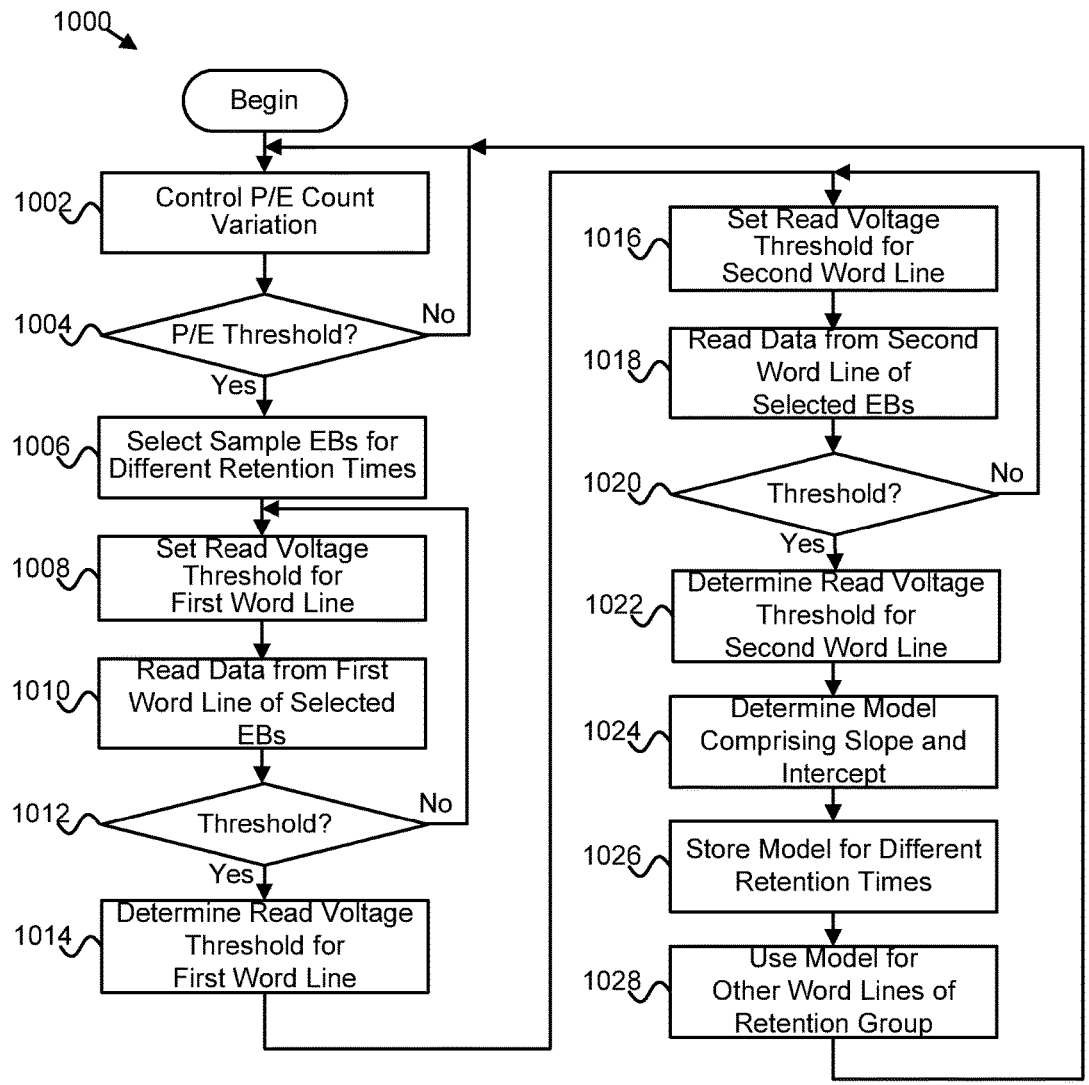
FIG. 10 is a schematic flow chart diagram illustrating a further embodiment of a method for model based configuration parameter management.

FIG. 10 is a schematic flow chart diagram illustrating a further embodiment of a method 1000 for model based configuration parameter management. The method 1000 begins, and the control module 404 controls 1002 variation of P/E cycle counts for erase blocks of the non-volatile memory media 122 of the non-volatile memory device 120. The trigger module 402 determines 1004 whether a P/E cycle count threshold is satisfied, and continues to monitor 1004 one or more P/E cycle counts (e.g., an average P/E cycle count for each storage element 123, for the non-volatile memory device 120, or the like) until a P/E cycle count threshold is satisfied.

In response to determining 1004 that a P/E cycle count threshold is satisfied, the association module 302 selects 1006 sample erase blocks or other storage regions for different retention time groups. The adjustment module 406 sets 1008 a read voltage threshold for a first sampled word line from each of the selected 1006 erase blocks and the read module 304 reads 1010 data from the first sampled word lines. The adjustment module 406 determines 1012 whether a threshold has been satisfied (e.g., a read retry threshold, an error threshold, or the like) and continues to adjust 1008 read voltage thresholds and the read module 304 continues to read 1010 data using adjusted 1008 read voltage threshold levels until the threshold is satisfied 1012. The configuration parameter module 308 determines 1014 an optimal or correct read voltage threshold for the first word lines based on the read 1010 data.

The adjustment module 406 sets 1016 a read voltage threshold for a second sampled word line from each of the selected 1006 erase blocks and the read module 304 reads 1018 data from the second sampled word lines. The adjustment module 406 determines 1020 whether a threshold has been satisfied (e.g., a read retry threshold, an error threshold, or the like) and continues to adjust 1016 read voltage thresholds and the read module 304 continues to read 1018 data using adjusted 1016 read voltage threshold levels until the threshold is satisfied 1020. The configuration parameter module 308 determines 1022 an optimal or correct read voltage threshold for the second word lines based on the read 1018 data.

The model module 306 determines 1024 a linear read voltage threshold model, comprising a slope and an intercept, based on the determined 1014, 1022 read voltage thresholds. The model module 306 and/or the cell configuration module 410 store 1026 different linear read voltage threshold models for different retention time groups for each memory element 123 and the cell configuration module 410 uses the determined 1024 model to read data from other word lines in the same retention time group as the first and second sampled word lines. The method 1000 continues, with the control module 404 controlling 1002 variation of P/E cycle counts for erase blocks of the non-volatile memory media 122 of the non-volatile memory device 120, the trigger module 402 continuing to monitor 1004 one or more P/E cycle counts until a P/E cycle count threshold is satisfied, and so on.

In various embodiments, a means for performing read operations may include a read module 304, a read pipeline 241, a configuration module 150, a non-volatile memory controller 124, a non-volatile memory media controller 126, a non-volatile memory device 120, a non-volatile memory element 123, a non-volatile memory medium 122, a device driver such as an SML 130, a processor 111, other logic hardware and/or other executable code stored on a computer readable storage medium. Other embodiments may include similar or equivalent means for performing read operations.

In various embodiments, a means for determining values for a configuration parameter may include a configuration parameter module 308, an adjustment module 406, a model module 306, a configuration module 150, a non-volatile memory controller 124, a non-volatile memory media controller 126, a device driver such as an SML 130, a processor 111, other logic hardware and/or other executable code stored on a computer readable storage medium. Other embodiments may include similar or equivalent means for determining values for a configuration parameter.

In various embodiments, a means for determining different models for different groups of storage regions may include a model module 306, a configuration module 150, a non-volatile memory controller 124, a non-volatile memory media controller 126, a device driver such as an SML 130, a processor 111, other logic hardware and/or other executable code stored on a computer readable storage medium. Other embodiments may include similar or equivalent means for determining different models for different groups of storage regions.

In various embodiments, a means for managing differences in storage media characteristics and/or for performing wear leveling may include a control module 404, a configuration module 150, a non-volatile memory controller 124, a non-volatile memory media controller 126, a device driver such as an SML 130, a processor 111, other logic hardware and/or other executable code stored on a computer readable storage medium. Other embodiments may include similar or equivalent means for managing differences in storage media characteristics and/or for performing wear leveling.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
 performing read operations for at least two different word lines of a storage region of a non-volatile storage device in response to a trigger;
 determining different values for a configuration parameter for the at least two different word lines based on the read operations; and
 setting, on the non-volatile storage device, different values for the configuration parameter for other word lines of the storage region based on a linear behavior model between the different values for the configuration parameter determined for the at least two different word lines, by storing a slope of the linear behavior model for the storage region of the non-volatile storage device and multiplying the slope by identifiers for the other word lines to set the different values for the configuration parameter for the other word lines.

2. The method of claim 1, further comprising using values for the configuration parameter based on the behavior model for a group of one or more additional storage regions.

3. The method of claim 2, wherein the one or more additional storage regions are selected for the group based on an amount of time since data was written to the one or more additional storage regions.

4. The method of claim 1, wherein the behavior model comprises a linear model comprising the slope and an intercept determined based on the values for the configuration parameter determined for the at least two different word lines.

5. The method of claim 4, wherein the slope comprises a negative slope such that values for the behavior model decrease as word line positions for the storage region increase.

6. The method of claim 1, further comprising determining different behavior models for different groups of storage regions grouped based on an amount of time since data was written to the storage regions of the different groups, read operations being performed for one or more storage regions from each of the different groups.

7. The method of claim 1, wherein the trigger comprises an age threshold being satisfied.

8. The method of claim 7, further comprising performing wear leveling for storage regions of the non-volatile storage device such that program/erase cycle counts for the storage regions are within a predefined range, the age threshold comprising a program/erase cycle count threshold.

9. The method of claim 1, wherein the at least two different word lines comprise word lines and the storage region comprises an erase block of a non-volatile storage medium.

10. The method of claim 9, wherein the word lines are selected to be separated from ends of the erase block by at least one word line.

11. The method of claim 9, wherein the behavior model is determined based on read operations for at least two word lines from multiple different erase blocks of a die of the non-volatile storage medium and the behavior model is used for the configuration parameter for the entire die of the non-volatile storage medium.

12. The method of claim 1, wherein the configuration parameter comprises one or more read voltage thresholds for storage cells of the non-volatile storage device.

13. An apparatus comprising:
an association module configured to group a plurality of erase blocks of a non-volatile memory medium based on an amount of time since data has been written to the plurality of erase blocks;
a read module configured to sample data of at least two different word lines from at least one erase block from each group of erase blocks; and
a configuration parameter module configured to set different read voltage thresholds for different word lines of the groups of erase blocks using different linear read voltage threshold models for different groups of the groups of erase blocks based on the sampled data of the at least two different word lines from the at least one erase block from each group of erase blocks, by storing a slope for the different linear read voltage threshold models for each different group of the groups of erase blocks and multiplying the stored slope for a group of the different groups by a position for a word line from the group to set the different read voltage thresholds for the different word lines of the groups,
wherein at least a portion of the association module, the read module, and the configuration module comprise one or more of logic hardware and a non-transitory computer readable storage medium storing executable code.

14. The apparatus of claim 13, further comprising a model module configured to determine the different read voltage threshold models for the different groups of erase blocks by interpolating read voltage thresholds for other word lines from the at least one sampled erase block from each group based on the sampled data from the at least two word lines from each group of erase blocks.

15. The apparatus of claim 14, further comprising a trigger module configured to determine that a trigger event has occurred, the read module configured to resample data from at least one erase block from each group of erase blocks and the model module configured to determine updated read voltage threshold models based on the resampled data, each in response to the trigger event.

16. The apparatus of claim 13, further comprising a trigger module configured to determine that a trigger event has occurred, the association module configured to regroup the plurality of erase blocks in response to the trigger event, the regrouping based on updated amounts of time since data has been written to the plurality of erase blocks.

17. The apparatus of claim 13, wherein the read module is configured to sample the data by rereading the data multiple times using different read voltage thresholds.

18. A system comprising:
a plurality of storage elements each comprising a plurality of storage regions; and
a controller for the storage elements, the controller configured to:
perform read operations for at least two different word lines of a storage region of the plurality of storage regions in response to a trigger;
determine different values for a configuration parameter for the at least two different word lines based on the read operations; and
set, on the storage elements, different values for the configuration parameter for other word lines of the storage region based on a linear behavior model between the different values for the configuration parameter determined for the at least two different word lines, by storing a slope for the linear behavior model for the storage region and multiplying the slope by an address for the other word lines to set the different values for the configuration parameter for the other word lines.

19. The system of claim 18, wherein at least a portion of the other word lines are disposed between the at least two different word lines for which the read operations were performed to determine the values for the configuration parameter.

20. The system of claim 18, wherein the controller comprises one or more of a hardware controller of a non-volatile storage device comprising the plurality of storage elements and a device driver for the non-volatile storage device comprising the plurality of storage elements, the device driver comprising computer executable code stored on a computer readable storage medium.

* * * * *